US010725720B2

(12) United States Patent
Cheung et al.

(10) Patent No.: US 10,725,720 B2
(45) Date of Patent: Jul. 28, 2020

(54) NAVIGATION IN AUGMENTED REALITY VIA A TRANSIENT USER INTERFACE CONTROL

(71) Applicant: Microsoft Technology Licensing, LLC, Redmond, WA (US)

(72) Inventors: Chairy Chiu Ying Cheung, Redmond, WA (US); Raghunath Mallya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 34 days.

(21) Appl. No.: 15/276,734

(22) Filed: Sep. 26, 2016

(65) Prior Publication Data

US 2018/0088746 A1    Mar. 29, 2018

(51) Int. Cl.
*G06F 3/048* (2013.01)
*G06F 3/14* (2006.01)
*G06T 11/00* (2006.01)
*G06F 3/147* (2006.01)

(52) U.S. Cl.
CPC ............... *G06F 3/14* (2013.01); *G06F 3/147* (2013.01); *G06T 11/00* (2013.01); *G09G 2370/16* (2013.01)

(58) Field of Classification Search
None
See application file for complete search history.

(56) References Cited

U.S. PATENT DOCUMENTS

| 7,266,785 | B2 | 9/2007 | Grotjohn |
| 7,343,568 | B2 | 3/2008 | Jiang et al. |
| 7,984,388 | B2 | 7/2011 | Dieberger et al. |
| 8,010,910 | B2 | 8/2011 | Wright et al. |
| 8,296,682 | B2 | 10/2012 | Sloo |
| 8,743,145 | B1* | 6/2014 | Price ............... G06T 19/006 345/629 |
| 9,081,580 | B2 | 7/2015 | Gaffney et al. |
| 2002/0059593 | A1 | 5/2002 | Shao et al. |
| 2006/0047673 | A1* | 3/2006 | Molander ......... G06F 17/30126 |

(Continued)

OTHER PUBLICATIONS

Brooks, et al., "Hoptrees: Branching History Navigation for Hierarchies", In Proceedings of 14th IFIP TC 13 International Conference on Human-Computer Interaction, Sep. 2, 2013, pp. 316-333.

(Continued)

Primary Examiner — William C Trapanese

(57) ABSTRACT

Examples provide for intelligent navigation of informational items within an augmented reality environment. A hierarchical set of informational items within the augmented reality environment is automatically generated. A current level in the hierarchy includes items currently within a field of view (FOV), a current topic of conversation, items associated with user movements, or items selected by the user. A transient user interface control directed to the current group of informational items and a contextual breadcrumb list is generated and displayed within the FOV. An action is performed on a selected group of informational items based on input received from the user via the transient user interface control. The results of the performed action are presented to the user within the FOV.

20 Claims, 14 Drawing Sheets

(56) References Cited

U.S. PATENT DOCUMENTS

| | | | |
|---|---|---|---|
| 2013/0138534 A1* | 5/2013 | Herwig | G06Q 30/0281 |
| | | | 705/26.62 |
| 2013/0339896 A1 | 12/2013 | Shadle et al. | |
| 2014/0173500 A1 | 6/2014 | Nguyen | |
| 2014/0244620 A1 | 8/2014 | Bertram et al. | |
| 2015/0248792 A1* | 9/2015 | Abovitz | G06F 16/7837 |
| | | | 345/633 |
| 2015/0346919 A1 | 12/2015 | Robbin et al. | |
| 2016/0370970 A1* | 12/2016 | Chu | G06F 3/04815 |

OTHER PUBLICATIONS

Plaisant, et al., "SpaceTree: Supporting Exploration in Large Node Link Tree, Design Evolution and Empirical in Evaluation", In Proceedings of IEEE Symposium on Information Visualization, Oct. 28, 2002, 8 pages.

"Changing the Sequential Order of Pages", Retrieved on: Jun. 2, 2012, 4 pages, Available at: https://confluence.atlassian.com/conf56/changing-the-sequential-order-of-pages-658736997.html.

* cited by examiner

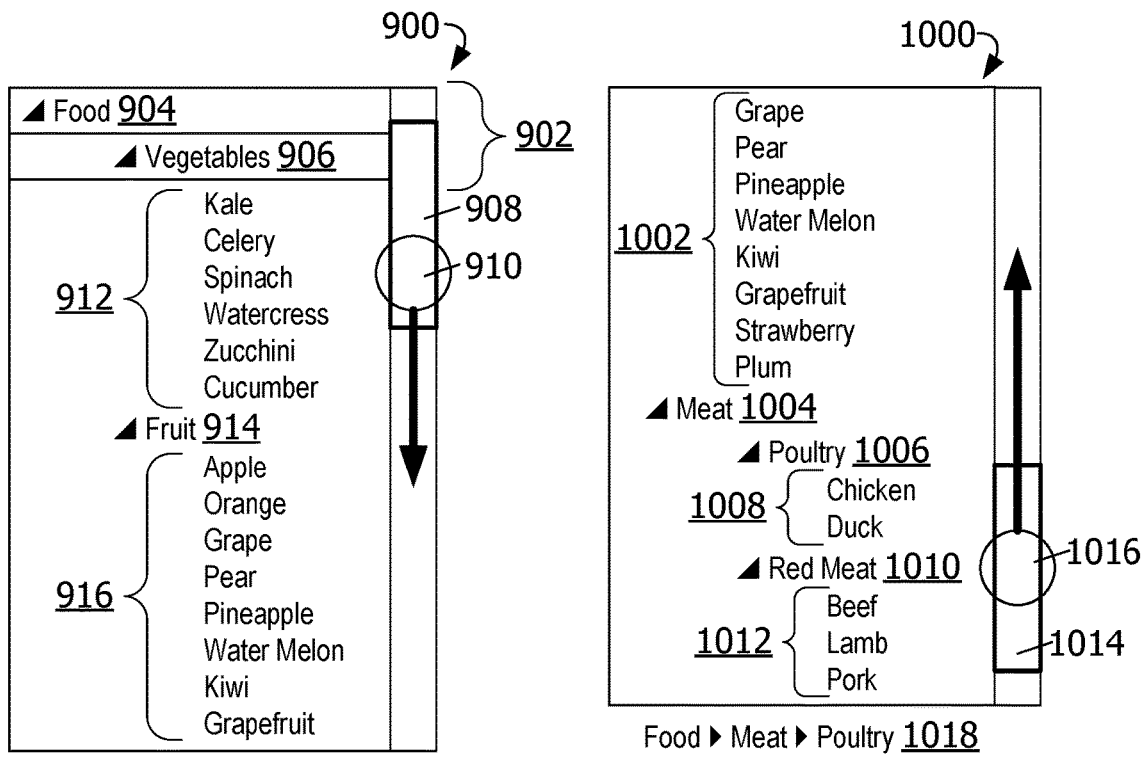
FIG. 9
FIG. 10
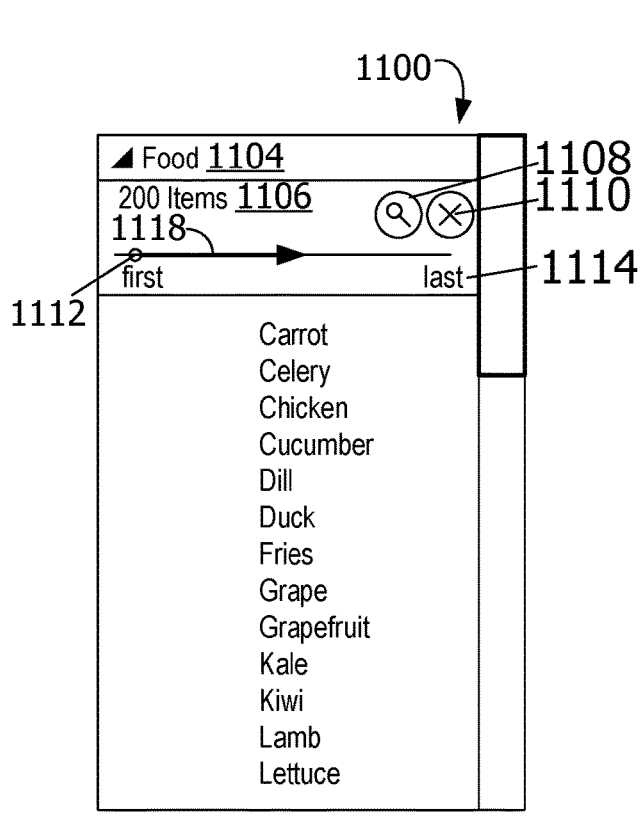
FIG. 11
FIG. 12

NAVIGATION IN AUGMENTED REALITY VIA A TRANSIENT USER INTERFACE CONTROL

BACKGROUND

An augmented reality device is a device that generates a field of view (FOV) of a real-world environment in which computer-generated elements, such as graphics, sound, smell, and/or haptic feedback are added to create a partial real-world reality and a partial virtual reality. The augmented reality is a direct or indirect view of the real-world environment augmented or supplemented with the computer-generated elements. A FOV within an augmented reality environment frequently includes a large variety and number of real-world and virtual items. Moreover, the FOV is frequently limited, requiring a user to move their head or body to view or locate items outside the FOV. Navigating through this augmented reality utilizing only the limited FOV may be cumbersome and time consuming for users in an expansive/complex environment, such as where the FOV includes large numbers of informational items, layers of informational items, and/or multiple different types of informational items.

SUMMARY

One example provides for intelligent navigation of a hierarchical set of informational items. A current group of informational items is automatically detected within a current field of view (FOV) of a user associated with an augmented reality environment. The augmented reality environment includes a plurality of groups of informational items. A transient user interface control directed to the current group of informational items is displayed within the FOV. An action is performed on the detected current group of informational items based on input received from the user via the presented transient user interface control. A result of the performed action is presented for display within the FOV.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is an exemplary block diagram of a transient user interface control presented in response to a user scrolling down.

FIG. 10 is an exemplary block diagram of a transient user interface control presented in response to a user scrolling up.

FIG. 11 is an exemplary block diagram of a scoped search icon and scoped sort icon associated with a transient user interface control.

FIG. 12 is an exemplary block diagram of a scoped search bar associated with a transient user interface control.

Corresponding reference characters indicate corresponding parts throughout the drawings.

DETAILED DESCRIPTION

Figure 1:
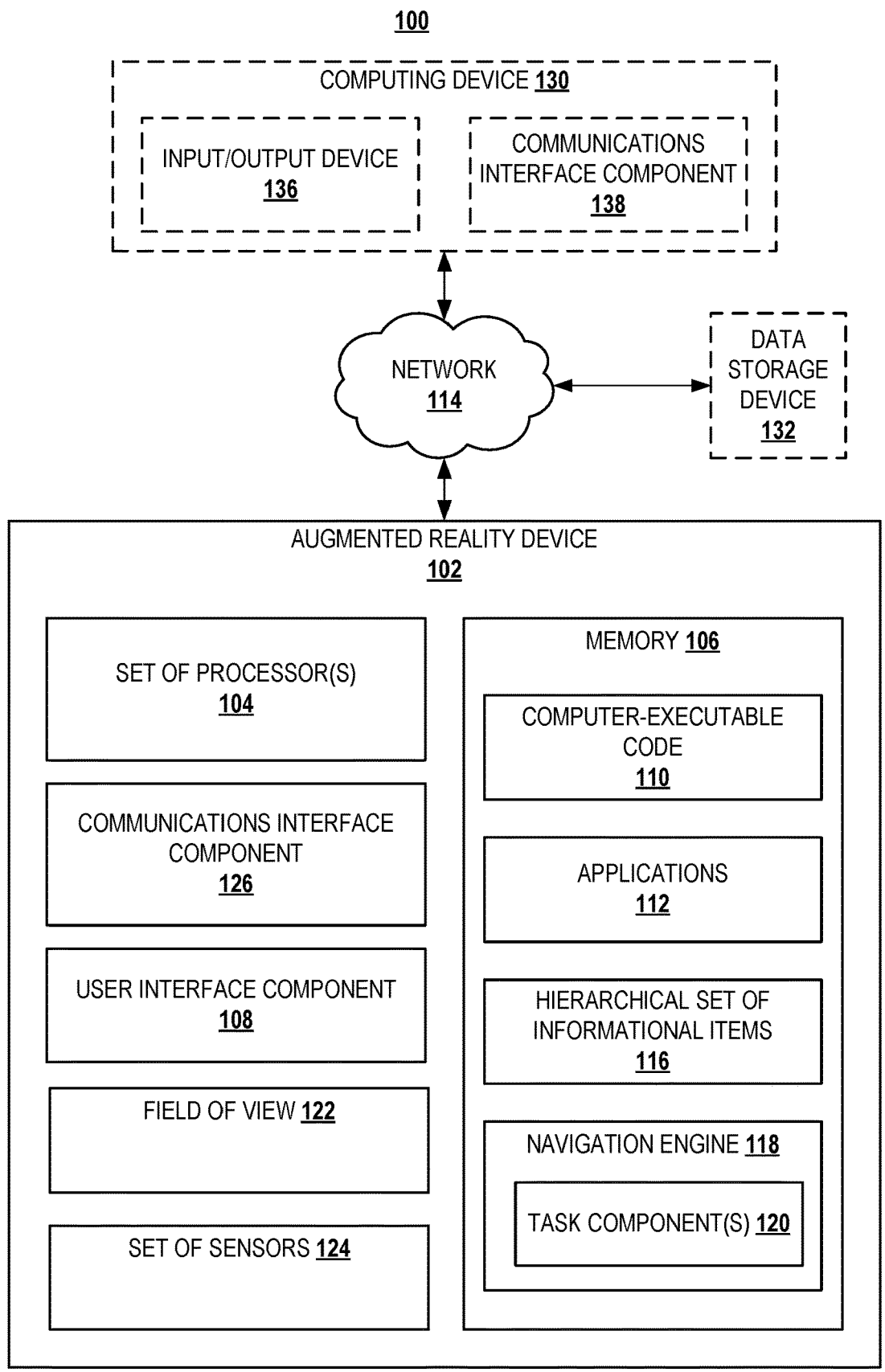
FIG. 1 is an exemplary block diagram illustrating a system for intelligent navigation of hierarchical groups of informational items.

Referring to the figures, examples of the disclosure enable intelligent navigation of hierarchical informational items within an augmented reality environment via navigational aids. The navigational aids may include a contextual breadcrumb list associated with a contextual user interface control displayed within a user's field of view (FOV) generated by an augmented reality (AR) device. In some examples, the contextual breadcrumb list includes a set of nodes representing a path from an item at a first level of the hierarchy to a set of current items at a current level within the hierarchy.

Aspects of the disclosure enable automatic generation of the navigational aids based on a set of user actions. The set of user actions may include user movements such as walking, hand gestures, head movements, eye movements, speaking, or any other user action. The user action(s) enable the user to navigate through at least a portion of the AR environment and/or obtain additional information associated with one or more items within the AR environment. The user action(s) trigger display of a hierarchical set of informational items associated with one or more items in the field of view (FOV) of the user. The hierarchical set of informational items provides an identification or other information associated with objects in the FOV, words spoken by one or more users, gestures made by one or more users within the AR environment, directions associated with the user's current location in the AR environment, or other information associated with the AR environment. The hierarchical set of informational items provides information to assist the user in more efficiently and effectively navigating through the AR environment.

The hierarchical set of information items may be provided to the user in a visual format, such as text or graphics, as well as in an audio format. The audio format may include natural language as well as non-language related sounds, such as beeps or other sounds.

The user may perform one or more action(s) to navigate through at least a portion of the hierarchical set of informational items displayed within the user's FOV. The user navigations include, for example and without limitation, scrolling, viewing, selecting, zooming-in, zooming-out, or other action associated with one or more items within the portion of a hierarchical list of informational items. The user action(s) may include a spoken word, a gesture, or other action.

The navigational aids are generated within the user's FOV in response to the user's current context within the AR environment and/or the user's actions associated with the items in the hierarchical list. This enables increased speed and efficiency during user navigation through the AR environment including a plurality of informational items. The navigation aids further improve user interactions and ease navigating complex data trees via the transient user interface control providing the contextual breadcrumb list.

Other examples provide a set of actions performed on informational items within the transient user interface control displayed within the FOV. The set of actions may be performed on item(s) at a current level within the hierarchy represented by the contextual breadcrumb list or item(s) within a selected level within the hierarchy. An exemplary set of actions includes a sort, a search, and/or a filter. The set of actions are scoped such that the action is performed only within the current level or selected level to narrow and further focus the sort, search, or filter operations. This reduces processor load and improves processor speed by narrowing the number of informational items to be included within the search, sort, or filter actions.

In some examples, the contextual breadcrumb list is dynamically generated based on user-defined context, such as scrolling, pinching, zooming, or otherwise navigating through the informational items without user-selection of individual items in the list. As the user navigates, the breadcrumbs auto-appear. This dynamic, contextual breadcrumb list enables users to search, sort, and filter a hierarchical list of informational items via a transient control that automatically updates as the user navigates through different portions of the hierarchical list.

Still other examples provide a transient scroll path. The transient scroll path is a contextual breadcrumb list that only includes items that appear within the FOV for a threshold time or are browsed through at a rate below a threshold rate. The pause or slower browsing rate indicates user interest associated with the one or more items. The transient scroll path provides a more focused contextual breadcrumb list to improve user efficiency and improve ease of navigation through large data sets presented to the user in complex hierarchical trees.

In still other examples, a contextual map of at least a portion of the AR environment is provided within the transient user interface control displayed within the FOV of the user by the AR device. The contextual map includes a graphic, such as an icon, indicating a current location of the user relative to one or more landmarks, such as an exit, an aisle, a wall, a display, a structure, or another location indicator. The contextual map may also include one or more graphics indicating items of interest to the user. The contextual map automatically updates based on current context of the user within the AR environment. The contextual map assists users in efficiently moving through the AR environment, locating desired items, identifying locations of entry/exit points, determining a route to a desired location, and so forth.

Referring again to FIG. 1, an exemplary block diagram illustrates a system for intelligent navigation of hierarchical groups of informational items associated with an AR environment. The computing system 100 is a system for providing navigational aids to assist users navigating through the AR environment and assist users navigating through hierarchical informational items associated with the AR environment. The computing system 100 includes an AR device 102 for generating at least a portion of the AR environment within a FOV 122 of the user.

In the example of FIG. 1, the AR device 102 is a computing device for generating the AR environment within the FOV of the user. In this example, the AR device is a wearable, head-mounted device, such as, but not limited to, a MICROSOFT HOLOLENS device. The AR device 102 places images of both physical real-world objects and virtual objects in the user's FOV. However, in other examples, the AR device may include one or more AR devices generating an AR environment for viewing by multiple users, such as, but not limited to, projection type AR devices.

The AR device executes instructions (e.g., as application programs, operating system functionality, or both) to implement the operations and functionality associated with the AR device 102. In some examples, the AR device 102 includes a set of one or more processors 104, a memory 106, and at least one user interface component 108.

The set of processors 104 includes any quantity of processing units. The set of processors 104 may include one or more holographic processing units (HPUs), group processing units (GPUs), and/or multi-core processors. A processor may also be referred to as a central processing unit (CPU).

The set of processors 104 is programmed to execute computer-executable code 110 for implementing aspects of the disclosure. The computer-executable code 110 may be referred to as computer-executable instructions. The computer-executable code 110 may be performed by a single processor or by multiple processors within the AR device 102, or performed by a processor external to the AR device 102. In some examples, the set of processors 104 is programmed to execute instructions such as those illustrated in the figures (e.g., FIG. 13, FIG. 14, FIG. 15, FIG. 16, and FIG. 17).

In some examples, the set of processors 104 represents an implementation of analog techniques to perform the operations described herein. For example, the operations may be performed by an analog computing device and/or a digital computing device.

The AR device 102 further has one or more computer readable media such as the memory 106. The memory 106 includes any quantity of media associated with or accessible by the AR device 102. The memory 106 may be internal to the AR device (as shown in FIG. 1), external to the AR device (not shown), or both (not shown). In some examples, the memory 106 includes read-only memory and/or memory wired into an analog computing device.

The memory 106 stores data, such as one or more applications 112. The applications 112, when executed by the processor 104, operate to perform functionality on the AR device 102. Exemplary applications include AR applications, mail application programs, web browsers, calendar application programs, address book application programs, messaging programs, media applications, location-based services, search programs, and the like.

In some examples, the applications 112 may optionally communicate with counterpart applications or services, such as web services accessible via a network 114. For example, the applications 112 may represent downloaded client-side applications that correspond to server-side services executing in a cloud.

The memory 106 further stores a plurality of informational items. The informational items include information associated with items in the AR environment. In this non-limiting example, the plurality of informational items is a plurality of groups of informational items in a hierarchy. A group includes one or more items at a given level within the hierarchy.

An informational item in the plurality of informational items may include physical items, a folder, a name of an object, a file, an image, a word, a picture, a document, an object, a portion of transcribed speech (e.g., as part of a human conversation), notes, or any other type of data. An informational item may be a single item, as well as a nested item containing one or more other informational items. A plurality of information items may be grouped into a hierarchy, such as a hierarchical set of informational items 116.

In some examples, the navigational engine generates or infers the hierarchical list of items by scanning or analyzing items in the AR environment. Alternatively, or in addition, the hierarchical set of information items may be inferred based on a sequence of browsing objects within the AR environment.

In other examples, the navigational engine retrieves a pre-generated hierarchical set of items. In still other examples, the hierarchical set of items is generated during a calibration phase, in which the AR device is calibrated to detect the items. The calibration may include image recognition and/or the user manually inputting information regarding one or more items within the AR environment.

The AR environment may include an environment inside a structure, outside a structure, or an environment that includes both interior and exterior areas. The AR environment may be a gaming environment, an environment inside a store, an amusement park, a library, a park, or any other location.

In yet another example, the hierarchical set of items is generated by the AR device receiving data from the one or more items, such as data from a tag, marker, bar code, radio frequency identification (RFID) tag, metadata, or another information source capable of communicating with the AR device. The hierarchical set of items is generated based on the received data.

The hierarchical set of informational items 116 may be organized with one or more items at a topmost level. The informational item at the topmost level may be referred to as a root node. The root node contains one or more nested items. A nested item may be referred to as a child node, nested child, sub-item, or child item. The nested item may also contain one or more nested items. A node that does not contain a nested item may be referred to as a leaf node. Each nested item is contained within at least one item at a higher-level within the hierarchy, which may be referred to as a parent node.

A hierarchical set of informational items may include a few items, hundreds of informational items, or even thousands of informational items or more. Each item may include a single nested item, hundreds of nested items, or even thousands of nested items or more.

In some examples, the navigation engine automatically detects navigation by the user within the tree to provide navigation aids within the tree structure. The navigation includes moving to different levels in the hierarchy, switching between siblings in a same level, and viewing one or more items at a particular level.

In other examples, the navigation engine automatically detects the current user location, FOV, or user actions within the AR environment to determine the current level within the hierarchical set of items. For example, if the AR environment is a library, the hierarchical set of informational items 116 displayed in the FOV includes sections within the library, such as children's section, teen/young adult, fiction, magazines, and non-fiction book section. The navigation engine determines the current level based on the user's location within the library, for example. If the user is in the non-fiction section, the non-fiction information item in the hierarchical set of informational items 116 is the current level. If the user's gaze, line-of-sight, or head is turned towards the fiction section, the context changes the current level to the fiction informational item in the hierarchical set of informational items 116. If the user touches, clicks, highlights, expands, opens, scrolls, or otherwise selects the children's section information item in the hierarchical set of items, then that children's section informational item becomes the selected level or new current level based on the user's actions.

The memory 106 in this example further includes a navigation engine 118. The navigation engine 118 is a software component executed on the one or more processors to generate navigational aids based on user context and/or input received from the user. The user context includes the user's location, body movements, or user actions. The navigation engine 118 leverages the context the user is interacting with in the AR environment and/or context within a hierarchical tree of informational items to provide the navigation aids. The navigation aids facilitate the user moving through the AR environment, obtaining information associated with item(s) in the AR environment, and/or locating an item in the hierarchical tree of informational items.

In some examples, the navigation engine 118 includes one or more task component(s) 120 for performing a task action. A task action is an action performed on a data set, such as searching, sorting, filtering, or otherwise manipulating items. The task component(s) 120 in this non-limiting example include, for example but without limitation, a scoped sort, a scoped search, and a scoped filter.

The scoped filter filters a subset of informational items within a plurality of informational items based on user context while navigating through at least a portion of the plurality of informational items and/or input received from the user. The scoped filter action in some examples may include filtering a subset of informational items in the plurality of informational items in accordance with one or more criteria. A criteria may include an attribute, a file type, an image, a file size, an image size, a font size, a coloration, a keyword, a conversation topic, a speaker's name, a location, a tag, a file type, a date, a time, an icon, or any other criteria.

The scoped sort performs a sort action on a subset of informational items in the plurality of informational items to change an order of the subset of informational items. The sort is performed in accordance with a current user context during navigation of the plurality of informational items and user input, such as one or more criteria. The scoped sort in some examples sorts a subset or group of informational items alphabetically, chronologically, numerically, topically, or according to any other criteria.

The scoped search performs a search action within a subset of informational items in the plurality of informational items to identify one or more items within the subset corresponding to one or more search criteria. The search criteria may include, without limitation, one or more search terms. The search is performed in accordance with the current user context during navigation of the plurality of informational items and user input, such as the one or more criteria.

The navigation engine 118 component, when executed by the processor of the AR device 102 causes the processor to automatically detect a current group of informational items among the plurality of informational items within a FOV generated by the AR device 102; present a transient user interface control directed to the detected current group of informational items to the user via the AR device; perform an action including a search, filter or sort of the detected current group of informational items based on input received from the user via the presented transient user interface control; and present a result of the performed action to the user.

In some examples, presenting the transient user interface control, a breadcrumb list, and/or results of a performed action to the user includes presenting visual data, such as graphics or text, in a display generated by the AR device within the FOV of the user. In other examples, presenting the transient user interface control, a breadcrumb list, and/or results of a performed action to the user includes presenting the data via an audio output, such as natural language or other sounds. The transient user interface control, a breadcrumb list, and/or results may also be presented via a combination of audio, visual, haptic, or other types of output.

The term "transient" refers to the user interface control being displayed and updated based on the user's current context. For example, the user interface control may be displayed temporarily or transiently during user navigation through items.

The content of the user interface control changes as the use moves through the AR environment, interacts with the AR environment, and/or interacts with the items in the hierarchical set of informational items 116. The content of the user interface control is updated as the user's context within the AR environment changes. When user navigation ceases, in some examples, the user interface control is no longer displayed (e.g., after a timeout period). Thus, the transient user interface control is non-persistent.

The AR device 102 includes a set of sensors 124 for receiving data associated with user movements, user location, sounds generated by the user, and other data associated with the user within the AR environment. The set of sensors 124 includes, without limitation, one or more cameras, audio sensors, depth sensors, pressure sensors, temperature sensors, ambient light sensors, etc.

The AR device 102 generates and displays navigational aids, such as a contextual breadcrumb list and/or results of performing an action on a group of informational items in the plurality of informational items, to the user. In some examples, the contextual breadcrumb list contains a plurality of nodes representing each item in a path leading from an item at a first level to one or more items at a current level being viewed by a user to a root node.

In one example, a node in the contextual breadcrumb list is a graphic or control representing a given level within the hierarchy of informational items. The graphic may include an icon, symbol, alphanumeric, or other graphical representation. In another example, a node in the contextual breadcrumb list is a graphic representing one or more items within the hierarchy of informational items. In still another example, a node in the contextual breadcrumb list is a graphic representing a group of two or more items within the same level of the hierarchy. In yet another example, a node within the contextual breadcrumb list represents both an item and a given level of the item within the hierarchy of informational items. In yet another example, a node in the breadcrumb list is a graphic representing a group of two or more items at a given level within the hierarchy.

The navigation engine receives input from the user in some examples via input/output device(s). The input/output device(s) may include, for example, but without limitation, a camera, speaker, keyboard, mouse, touch screen, speaker, voice recognition system, or any other type of input or output device.

The AR device 102 may be self-contained (e.g., not rely on other devices for processing or storage). For example, the AR device 102 may perform the operations described herein, and store any results, within the AR device 102 itself. In other examples (shown as dashed lines in FIG. 1), the AR device 102 communicates with other devices, such as computing device 130 and data storage device 132 via network 114, for processing or storage support.

The AR device 102 may include a communications interface component 126. The communications interface component 126 includes a network interface card and/or computer-executable instructions (e.g., a driver) for operating the network interface card. Communication between the AR device 102 and other devices, such as computing device 130 and data storage device 132, may occur using any protocol or mechanism over any wired or wireless connection. In some examples, the communications interface component 126 is operable with short range communication technologies, such as by using near-field communication (NFC) tags.

The computing device 130 may be implemented as a mobile computing device or any other portable device. In some examples, the mobile computing device includes a mobile telephone, laptop, tablet, computing pad, netbook, gaming device, an AR device, and/or portable media player. The computing devices may also include less portable devices such as servers, desktop personal computers, kiosks, tabletop devices, and industrial control devices. Additionally, the computing device may represent a group of processing units or other computing devices.

The computing device 130 may include an input/output device 136 for sending and receiving data from a user. The computing device 130 may also include communications interface component 138 for connecting with one or more other computing devices via the network 114.

In some examples, the user views one or more items from the plurality of informational items within the FOV 122 of the AR device 102. The user provides input via the input/output device(s) and/or the set of sensors 124 to the navigation engine 118. The navigation engine generates navigational aids based on the user's current context and the input. The user views the navigational aids via the FOV 122 generated by the AR device 102.

In other examples, the AR device 102 connects to one or more remote computing devices, such as computing device 130 and/or data storage device 132, via the network 114. The network 114 may include any type of network connection, such as a local area network (LAN), a wide area network (WAN), a BLUETOOTH, Wi-Fi, cellular network, or any other network connection. In some examples, the network 114 is the Internet.

The data storage device 132 may include one or more spinning magnetic disks or solid state drives. A data storage device in some examples includes, without limitation, one or more hard disks, one or more flash drives, as well as any other type of device for storing data. The data storage device 132 in other examples includes a redundant array of independent disks (RAID) array. In still other examples, the data storage device includes one or more cloud storage on a public or private cloud accessible via the network 114.

In some examples, the data storage device 132 stores metadata associated with one or more items in the AR environment and/or one or more information items in the plurality of informational items. Metadata is data about other data. The scoped search, scoped filter, and/or scoped sort may be performed using metadata associated with one or more items retrieved from the data storage device 132. The contextual map may be generated and/or updated using the metadata.

For example, the metadata may include data identifying or describing one or more items within the AR environment before the user views the item in the FOV of the AR device. In one example, a store database may include a map of the store, an identification of items in the store, and other information for items in the store. The metadata may include item prices, weights, locations, types, etc. The metadata may include locations of exits, point-of-sale (POS) devices, grocery carts, baskets, water fountains, deli, frozen foods, restaurants within the store, etc. In these examples, the AR device accesses this information from the database to identify items without scanning the items.

In this example, the data storage device 132 is located remotely from the AR device 102. In other examples, the data storage device 132 is located internally to the AR device 102 or connected to the AR device 102 as a peripheral device (not shown).

In some examples, the user interface component 108 includes a graphics card for displaying data to the user and receiving data from the user. The user interface component 108 may also include computer-executable instructions (e.g., a driver) for operating the graphics card. Further, the user interface component 108 may include a display (e.g., a touch screen displays or natural user interface) and/or computer-executable instructions (e.g., a driver) for operating the display. The user interface component may also include one or more of the following to provide data to the user or receive data from the user: speakers, a sound card, a camera, a microphone, a vibration motor, one or more accelerometers, a BLUETOOTH brand communication module, global positioning system (GPS) hardware, and a photoreceptive light sensor. For example, the user may input commands or manipulate data by moving the computing device in a particular way.

In some examples, the navigation engine 118 utilizes data received from the set of sensors 124 and/or the user interface component 108 to detect movement of the user. The navigation engine 118 retrieves a hierarchy of information items or infers the hierarchy of informational items based on the movement(s) of the user and/or the items visible within the FOV of the user. The navigation engine 118 defines the context of the user based on the movement(s) of the user within the AR environment and/or the FOV. In one example, the user browses through a real-world store while wearing the AR device 102. The term "browse" refers to a user looking at object in the FOV, walking through the store, etc.

The navigation engine 118 utilizes the movements of the user and the items visible within the FOV to create the hierarchy of informational items. The hierarchy of informational items is displayed within the FOV. The navigation engine creates a breadcrumb list within the FOV based on the user's current context within the store. The breadcrumb list may include:

Store name→Aisle 5→Top Shelf→Soap

The navigation engine performs one or more actions on the hierarchical list of informational items based on input from the user. The user may choose to initiate a scoped action, such as a search, sort, and/or filter.

In other examples, the navigation engine 118 includes supplemented data from different levels of the hierarchy. Because the FOV is limited, the user cannot see what is on the next aisle, behind the user, around the corner, above the FOV, below the FOV, etc. The navigation engine 118 obtains supplemental data associated with items in the AR environment from supplemental data sources, such as browsing history, knowledge of a store map, an initial room analysis, data stored in a database or file system on a data storage device, such as data storage device 132. The supplemental data is provided to the user via the transient user interface control displayed within the FOV of the user.

In still other examples, the navigation engine utilizes the supplemental data obtained from the supplemental data sources to generate suggestions for the user. The suggestions are generated based on information regarding surrounding area(s) outside the FOV of the user.

The suggestions may include directions to a suggested location, suggestions regarding additional items for purchase, suggestions for strategies to implement in an AR gaming environment, suggestions for things the user may want to do within the environment, etc. In other words, the suggestions may include information regarding things the user can do within the AR environment. For example, in an amusement park, the suggestions may include recommended restaurants, rides, games, or other activities the user may be interested. The suggestions may include directions.

The suggestions may be provided in a visual format within the FOV of the user. In other examples, the suggestions may be provided in an audio format, such as natural language or other sounds. In still other examples, the suggestions are provided via a combination of visual and auditory output, such as graphics, text, spoken words, and other sounds. In yet another example, the suggestions may be provided via haptic data output, such as, but not limited to, vibrations.

Figure 2:
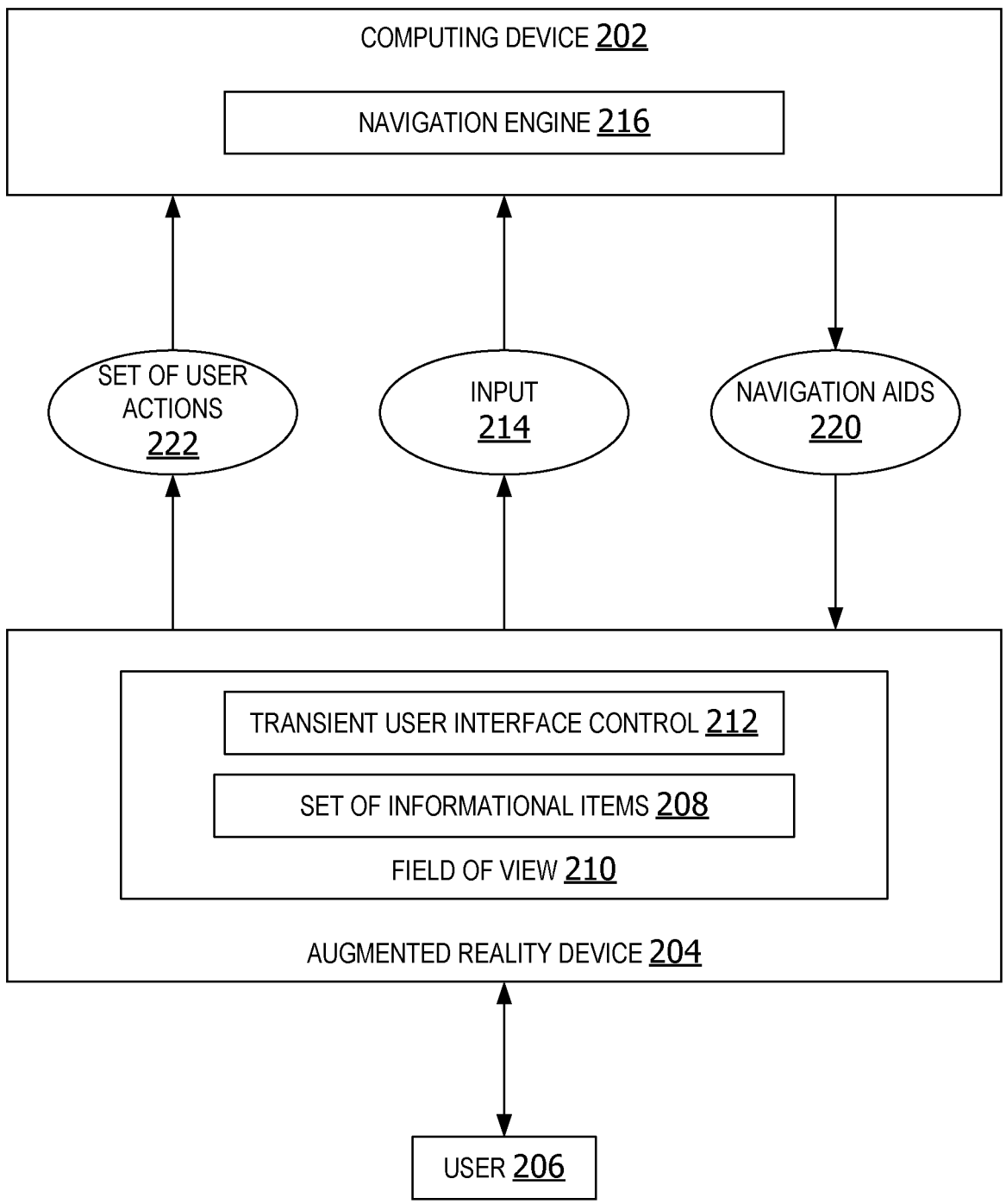
FIG. 2 is an exemplary block diagram illustrating a system for intelligent navigation of hierarchical groups.

Referring now to FIG. 2, an exemplary block diagram illustrating a system for intelligent navigation of hierarchical groups is shown. The computing system 200 includes one or more computing devices, such as computing device 202 and AR device 204. The computing devices may be connected via a network connection, such as, but without limitation, the network 114 in FIG. 1. In the example of FIG. 2, the AR device 204 and computing device 202 function cooperatively to implement the functions described herein. In these examples, the computing device 202 may be referred to as being in the cloud. Alternatively, the functionality of the computing device 202 (including navigation engine 216) as described herein may be performed locally by the AR device 204, without communication with an external device such as computing device 202.

In this example, a user 206 views a hierarchical set of informational items 208 from a plurality of informational items displayed within a FOV 210 generated by the AR device 204. The set of informational items 208 includes one or more items from the plurality of informational items that are being viewed by the user, such as within the FOV 210. In this non-limiting example, the set of informational items 208 includes items within the same level of a hierarchy of the plurality of informational items.

A transient user interface control 212 is presented to the user 206 in the FOV display. The transient user interface control 212 may be added onto an image of a real-world object as an overlay or otherwise included anywhere within the FOV.

The transient user interface control is a user interface providing a set of navigational aids to assist the user 206 in navigating through the plurality of informational items. The user interface control is displayed temporarily or transiently during user navigation through items in the plurality of informational items within the hierarchy. In some examples, the transient user interface control 212 is displayed when a user begins moving, speaking, or otherwise navigating through items in the AR environment, without clicking on or selecting any of the items being viewed or displayed during the navigation. The user movements through the AR environment may include walking, pointing, gesturing, reaching towards, swiping, moving a finger and thumb together, eye movements, head movements, neck movements, or other body movements.

In some examples, the transient user interface control 212 includes a contextual breadcrumb trail representing a path from a root node in the plurality of informational items to the set of informational items 208 currently being viewed by the user 206. However, in other examples, the transient user interface control does not include the contextual breadcrumb list. The contextual breadcrumb list may be presented separately from the transient user interface control or presented without the transient user interface control.

In this example, the transient user interface control 212 includes a graphical user interface (GUI) in the FOV. A user may select one or more icons or other graphical representations within the GUI to perform actions associated with the set of informational items, such as sort, filter, and search actions.

The user 206 generates input 214 in some examples via the user interface. The input initiates performance of an action on the set of informational items. The action may include scrolling through a portion of the plurality of informational items, selecting, expanding, opening, closing, zooming in on one or more items, or zooming out. Zooming in and zooming out in some examples includes a pinch action detected by a camera to perform a pinch-in or pinch-out. Pinching includes moving a finger and thumb together or apart in front of a camera or other motion detection device to zoom out, zoom in, expand or contract an image being viewed on a display.

In some examples, the AR device 204 sends the input 214 to the navigation engine 216 to trigger generation of navigation aids 220. The navigation aids 220 in some examples include a contextual breadcrumb list which is displayed within the transient user interface control 212. The contextual breadcrumb list includes a node representing each parent item in a path from the root node to the current set of informational items 208 being viewed by the user.

In other examples, the navigation aids 220 includes a contextual map of at least a portion of the AR environment. In some examples, the contextual map shows the user's current location relative to one or more other items, landmarks, structures, navigational paths, or other landmarks. In still other examples, the contextual map includes arrows, highlighting, or other indicators showing a path from the user's current location to another location within the AR environment. The path provides directions from the current location to the desired location. The contextual map updates the path indictors as the user moves through the AR environment.

In some examples, the contextual map is a map provided within an AR gaming environment. The contextual map may include indicators of locations of other players, locations of objects within the game, current location of the user, locations of a target within the game, etc.

In yet another example, the hierarchical set of informational items 116 includes identifiers associated with transcribed human speech. The transcribed human speech may be a conversation between two or more people, as well as dictated speech generated by a single user. The identifiers may include topics of conversation, identification of a speaker, date the speech was recorded or occurred, time the speech was recorded or occurred, location where the speech was recorded or occurred, and/or any other identifiers for organizing transcribed speech.

In these examples, the conversation flow defines the hierarchy or sequence of nodes within the hierarchical list or breadcrumb list. A user action is used to retrieve the earlier conversation snippets from a particular user. In one example, where users discuss products available in a store, the hierarchical set of informational items provided in the FOV may include topic identifiers and a time stamp for identifying different portions of the conversation, such as:

Clothing at 2:45 p.m.; Shoes at 3:01p.m.; Food at 3:09.

The node for shoes may include nested topic identifiers such as, but not limited to:

Shoes→Running Shoes→Orthopedic Running Shoes.

If a user selects the node for "running shoes", the navigation engine displays the transcribed text for the portion of the conversation in which running shoes were discussed by one or more of the users. The retrieved portion of text may be presented in a speech bubble within the transient user interface of the FOV.

In other examples, the actions include search, sort, filter, and rewind. The user can "rewind" the conversation data back to a previous point in time. In one example, the user can rewind a conversation back ten minutes to replay a portion of the conversation in an audio format or view a transcribed format of the conversation that occurred ten minutes. This assists the user in obtaining desired information more quickly and efficiently.

In other examples, the navigation engine 216 automatically generates the navigational aids 220 when the navigation engine 216 receives scroll data 222 indicating that the user 206 is scrolling through at least a portion of the plurality of informational items displayed in the transient user interface control 212 of the FOV 210. In some examples, the scroll data 222 is generated when a user scrolls up or scrolls down through a list of informational items, such as the set of informational items 208 or a portion of the plurality of informational items.

In other examples, the scroll data 222 is generated when a user stops scrolling for a threshold period of time before resuming scrolling associated with the plurality of informational items. The threshold period of time may be referred to as a threshold pause time. In other examples, the scroll data 222 is generated when a user's rate of scrolling through items in the hierarchical tree is less than or equal to a threshold scroll rate.

In other examples, browsing data is generated when a user is browsing or looking at one or more items in the FOV for a threshold period of time before resuming looking or browsing through other items in the plurality of items. The threshold period of time may be referred to as a threshold pause time. In other examples, the browsing data is generated when a user's rate of browsing through items in the FOV is less than or equal to a threshold rate.

In this example, the navigation engine 216 is located on a first computing device and the transient user interface control is displayed to the user via a second computing device located remotely to the first computing device. For example, the first computing device may transmit the navigational aids for display by the AR device. However, in other examples, the navigation engine 216 and the transient user interface control 212 are implemented within the same computing device.

Figure 3:
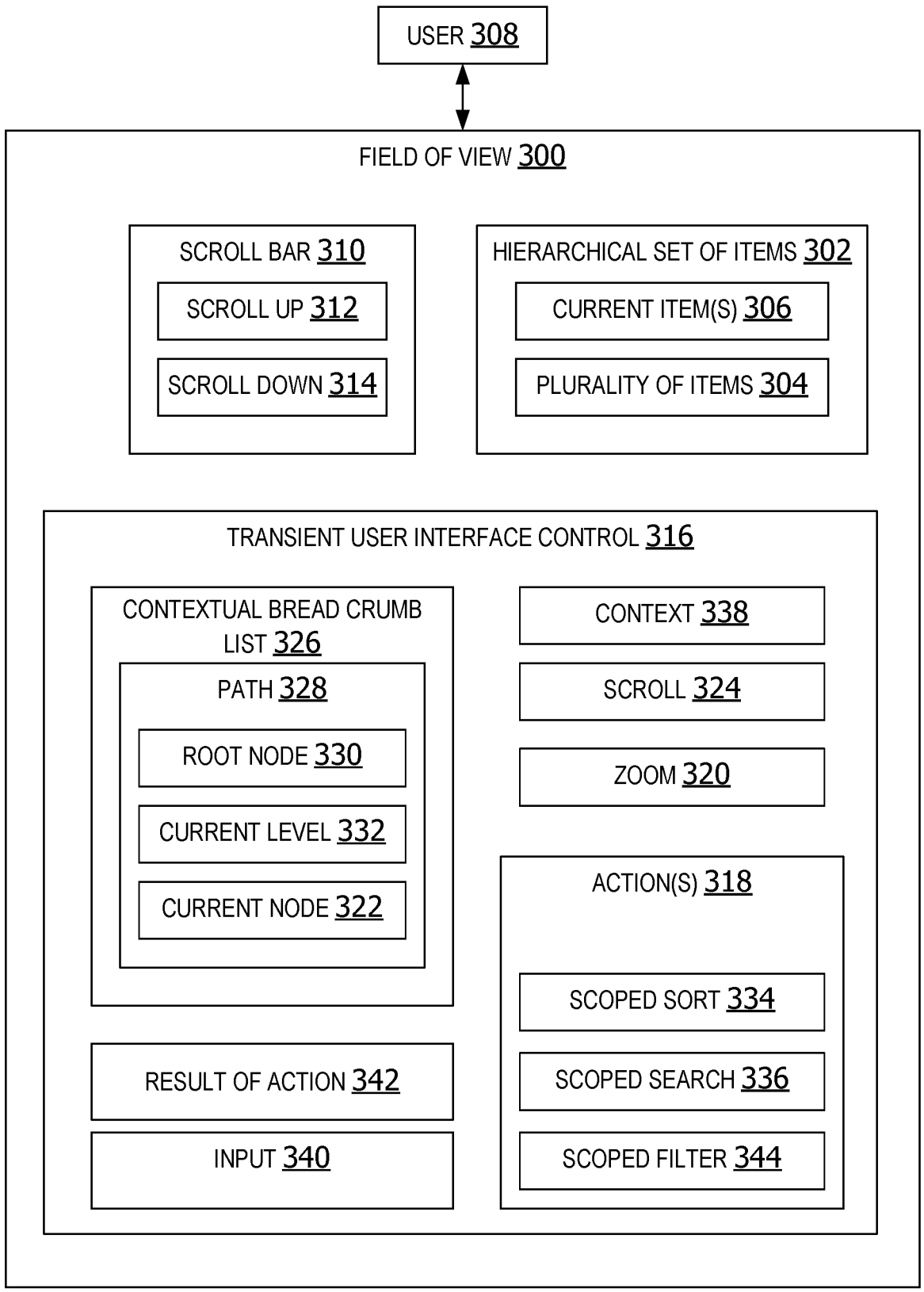
FIG. 3 is an exemplary block diagram of a display presenting a transient user interface control.

FIG. 3 is an exemplary block diagram of a FOV 300 generated by an augmented reality device. The FOV 300 includes a transient user interface control. The FOV 300 presents a hierarchical set of informational items 302. The hierarchical set of informational items 302 includes a plurality of informational items 304 in a hierarchical order or organized into hierarchical levels. The current item(s) 306 includes one or more items in the plurality of informational items 304 being viewed by the user 308.

The display in this example includes a scroll bar 310. The user 308 utilizes the scroll bar 310 to scroll up 312 or scroll down 314 through a portion of the hierarchical set of informational items 302.

As used herein, the term "scroll up" may refer to utilizing a vertical scroll bar to scroll up or utilizing a horizontal scroll bar to scroll through items. In some examples, scrolling up refers to scrolling through items in a hierarchical tree towards a higher level within the tree. As used herein, the term "scroll down" may refer to a user utilizing a horizontal scroll bar and/or a vertical scroll bar. Scrolling down may refer to scrolling through a hierarchical tree towards a lower level within the tree. The scroll bar is activated by a hand gesture, movement, verbal command, or other user input detected by a set of sensors and/or an input device.

The user 308 may utilize the scroll bar 310 via an input device, such as a touch screen, a keyboard, a mouse, a microphone for receiving verbal commands, a camera enabling gesture detection, or any other type of device or method for receiving input from a user. In other words, a user may manipulate the scroll bar 310 using touch, voice, hand gesture, eye movement, walking, or any other type of input indicating a scroll up 312 or scroll down 314.

A transient user interface control 316 is a user interface presented to the user 308 within the FOV 300. The transient user interface control 316 includes one or more navigational aids to assist the user in navigating through the hierarchical set of informational items 302. The transient user interface control 316 is automatically generated and displayed to the user dynamically in response to the user navigating through at least a portion of the items in the hierarchical set of informational items 302. In some examples, the user navigates through the items by performing a zoom 320 or a scroll 324.

A zoom 320 includes zooming in or zooming out. A zoom 320 in other examples includes a pinch, such as by moving a finger and thumb together or apart to perform a function. The zoom 320 may be performed to open a folder, magnify an image, shrink an image, or change a document view. For example, a user may zoom in on a folder to open the folder up, which triggers an automatic generation of the contextual breadcrumb list representing a path from a root node to the opened folder.

A scroll 324 includes scrolling up and scrolling down. The scroll 324 may be performed using a scroll bar 310 control or other gesture.

In response to the user 308 performing a zoom 320, scroll 324 or other navigation associated with one or more current item(s) being viewed on display by the user 308, the navigation engine automatically generates a contextual breadcrumb list 326.

The contextual breadcrumb list 326 represents a path 328 through the hierarchical set of informational items 302 from a root node to a current node 322. The current node represents one or more current item(s) 306 being viewed at a current level 332 of the hierarchy. In this example, the contextual breadcrumb list 326 includes two nodes, the root node 330 and the current node 322. In other examples, the contextual breadcrumb list 326 includes any number of nodes.

The contextual breadcrumb list 326 in this example is displayed within the transient user interface control 316. The contextual breadcrumb list 326 includes a current node representing at least one item in the current level 332 and one or more nodes representing each parent node of the current node. A node may be presented within the contextual breadcrumb list as an icon, button, symbol, alphanumeric, or other graphic to represent a given node. A user may select a node within the contextual breadcrumb list to view items within the hierarchical level represented by the selected node. In other words, the user navigates to a higher level in the hierarchy by selecting a breadcrumb in the contextual breadcrumb list.

In some examples, the user may select two or more nodes to display items corresponding to the two or more nodes while excluding the items associated with the unselected nodes. In this manner, a user may collapse the excluded nodes in between other nodes. This helps the user perform other operations, such as moving an item from under one node to under a more distant node without having to traverse multiple nodes or levels.

In some examples, the user may perform a task action 318. A task action is an action to manage, filter, sort, search, organize, or otherwise manipulate at least a portion of the items in the hierarchical set of informational items. In this example, the task action 318 includes a scoped sort 334, a scoped search 336, and a scoped filter 344.

In some examples, the scope is the current level within the hierarchy. In other examples, the scope is a current subset of informational items within the current level. In other words, the scope may include all siblings within a given level or be limited to only a single sibling in the given level. The user may change the scope by selecting a higher level within the hierarchy for the scoped sort, search, or filter. In some examples, the user changes the scope by selecting one or more nodes in the contextual breadcrumb list or the transient scroll list. In still other examples, the default scope is the current context until the user selects to change the scope.

The scoped filter 344 filters items within the current level or a selected level in accordance with one or more user selected filter criteria. In this example, the scoped filter performs the filter operation on only the current items 306 and items nested within the current items 306 associated with the current level. The scoped filter 344 does not filter items elsewhere (e.g., higher) in the hierarchy of informational items. In other words, the scoped filter 344 does not filter all items in the hierarchical set of informational items. It only filters items within the context of the current level being viewed or scrolled through by the user.

The filter criteria may include any user selected criteria. In some examples, filter criteria may include, without limitation, date, price, color, age, category, name, or any other selected criteria.

In other examples, the scoped sort 334 performs a sort within the context 338 of the current level 332 of the hierarchical set of informational items 302. The current context 338 is the current level 332 being viewed by the user. In other examples, the context 338 is the one or more levels the user is interacting within the hierarchical tree of informational items.

The current context 338 limits the scope of the scoped sort. In other words, the scoped sort 334 performs a sort on two or more items within the current level 332. The sort is transient because the sort is only performed within the current level represented by the contextual breadcrumb list 326, and the current level may change as described herein.

Likewise, the scoped search 336 in this example is only performed within the current level represented by the contextual breadcrumb list 326. The search is performed in accordance with one or more criteria within the current level of the hierarchical tree. In some examples, the scoped search 336 includes a fuzzy search. A fuzzy search returns search results that do not exactly match the search terms. In other words, the fuzzy search returns results that are close but not exactly matching the search terms.

The user 308 performs a task action via input 340 provided by the user. The input 340 is provided via an input device. In some examples, the user provides input by selecting an icon or other graphical control in FOV 300, such as scroll bar 310.

In some examples, the navigation engine presents the results 342 of an action performed on the hierarchical set of informational items 302 within the transient user interface control 316. The results 342 of an action are the results of a task action performed within a given level of the hierarchy. For example, if the action performed is a scoped search, the search result is output to the user within the transient user interface control 316 as results 342. If a sort is performed, the scoped sort results are output as results 342.

In other examples, the navigation engine displays the results of the task action 318 within a results area of the display that is separate from the transient user interface control 316. In this example, the transient user interface control provides the contextual breadcrumb list 326 and the result of the task action 318. In other examples, results of the task action 318 are provided in a separate results area (not shown) of the display in the FOV generated by the augmented reality device.

Thus, the navigation engine infers a hierarchy of informational items and/or a breadcrumb list based on the user context, including user browsing items within the FOV of the user and/or the sequence of browsing in the FOV. As the user views a group of objects in the FOV of the user, the search/sort may be performed on only those objects currently being viewed within the FOV. This is the current level based on the user's actions and/or current FOV.

In one example, a user is browsing in a supermarket. As the user walks through the supermarket viewing objects on the shelves, in the bins, and arrange in end-cap displays, the navigation engine tracks the objects within the user's FOV and within the user's line-of-sight/gaze. The data associated with the objects the user looks at may be referred to as browsing data. As the user looks at vegetables and then tomatoes, the current level is updated as follows:

Food→Produce→Vegetables→Tomatoes

An action may be performed on only those items at the current level. The action is limited to items the user sees in the current FOV. In this example, the tomatoes may be sorted by size, color, or price. A price sort may be performed on the tomatoes in the user's FOV. In other examples, the action is not limited to the items in the current FOV. The action may be performed on all items within a particular level. For example, the price sort may be performed on all vegetable, regardless of whether those vegetables are visible within the current FOV of the user. Likewise, the price sort may be performed on all tomatoes, not just the tomatoes currently visible within the FOV. For example, if organic tomatoes are within the FOV but inorganic tomatoes are outside the FOV, both types of tomatoes may be included in the price sort if the user chooses to perform the action at the level for "tomatoes" rather than the level for "tomatoes in the FOV."

The browsing data indicates an amount of time the user viewed one or more items. If the user looks at apples for the threshold period of time but looks at pears for less than the threshold time, the apples are included in the contextual breadcrumb list but the pears are excluded from the contextual breadcrumb list.

Figure 4:
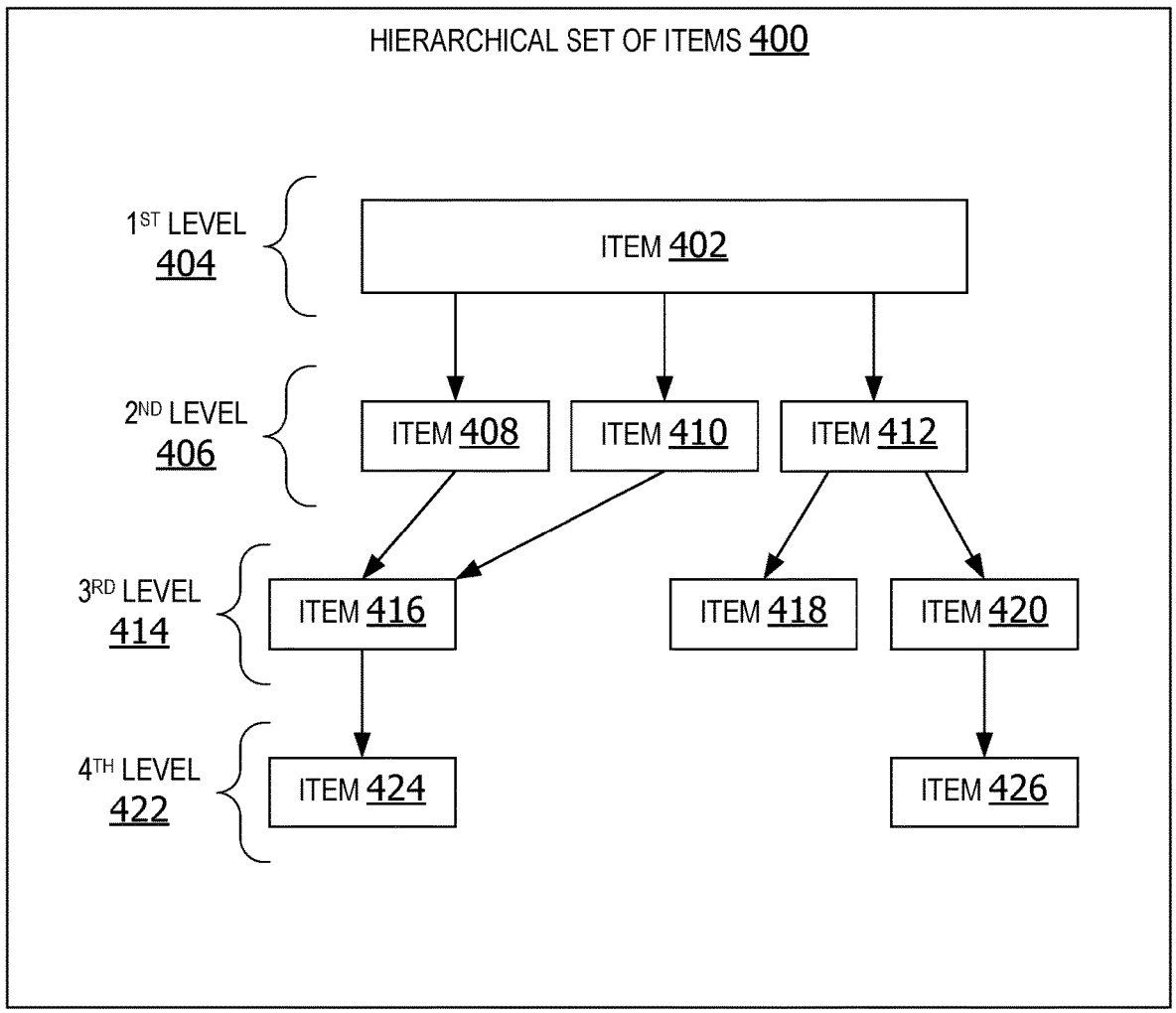
FIG. 4 is an exemplary block diagram of a hierarchical set of informational items.

FIG. 4 is an exemplary block diagram of a hierarchical set of informational items. The hierarchical set of informational items 400 in this example includes a plurality of informational items at a plurality of different levels. The hierarchical set of informational items in other examples includes a plurality of groups of informational items at a plurality of different levels.

The hierarchical set of informational items 400 may be referred to as a hierarchical tree of informational items. In some non-limiting examples, the hierarchical set of informational items 400 includes one or more hierarchical file systems including a plurality of files.

In this example, item 402 is an item at a highest or first level 404. The item 402 includes one or more nested items at a second level 406. In this example, the nested items at the second level 406 include item 408, item 410, and item 412. However, an item is not limited to three nested items. An item may include any number of nested items.

Each nested item at the second level may include no nested items, a single nested item, as well as two or more nested items. In this example, items 408 and 410 include nested items 416 at the third level 414. The item 412 at the second level in this example includes nested items 418 and 420 at the third level 414.

Likewise, the nested items 416 at the third level includes a nested item 424 at the fourth level. The nested item 420 also includes nested item 426 at the fourth level. The item 418 at the third level does not include any additional nested items.

In one example, if the current items being viewed by a user includes item 426, the contextual breadcrumb list includes a node representing item 426, item 420, item 412, and item 402. In this manner, the contextual breadcrumb list represents the path from the current item 426 at the current level 422 to item 402, which is represented in the contextual breadcrumb list by the root node.

In another example, if the user scrolls, zooms, pinches, or otherwise selects item 416 in the FOV, the contextual breadcrumb list includes a node representing the current item 416, parent item 408 and parent item 402. In another example, the contextual breadcrumb list includes a node representing item 416, a node representing both items 408 and 410, and a root node representing item 402.

The hierarchical set of informational items 400 in this example includes four levels. However, the examples are not limited to four levels. A hierarchical set of informational items 400 may include items at two levels, three levels, as well as five or more levels.

Figure 5:
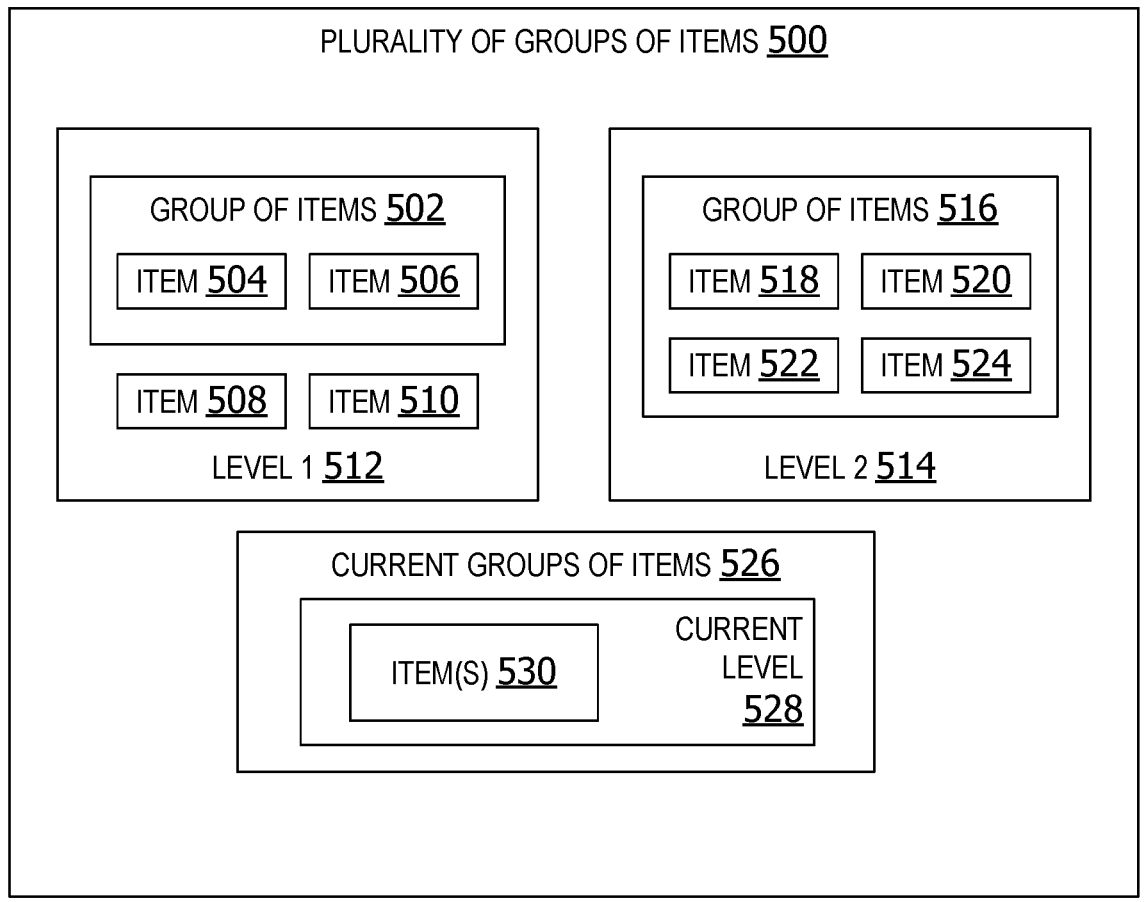
FIG. 5 is an exemplary block diagram of a plurality of groups of informational items.

Referring now to FIG. 5, an exemplary block diagram of a plurality of groups of informational items 500 within a plurality of different levels is shown. Each item may include no nested items, a single nested item, as well as two or more nested items.

In this example, group of informational items 502 is a group that includes nested items 504 and 506 at a first level 512. The first level also includes item 508 and item 510 which are not included in the group of informational items 502. In this example, item 504 includes a second group of informational items 516 at the second level 514.

The second group of items 516 in this example includes nested items item 518, item 520, item 522, and item 524. In other words, items 518, 520, 522, and 524 are included within item 504.

The current groups of items 526 includes the one or more item(s) 530 currently being viewed by the user at the current level 528. The current groups of informational items are not limited to a single item at a single level. The current groups of informational items may include two or more items at a current level.

The current level 528 may be any level in the hierarchy. The current level 528 may include the first level 512, the second level 514, as well as any other level associated with the current group of informational items 526.

Figure 6:
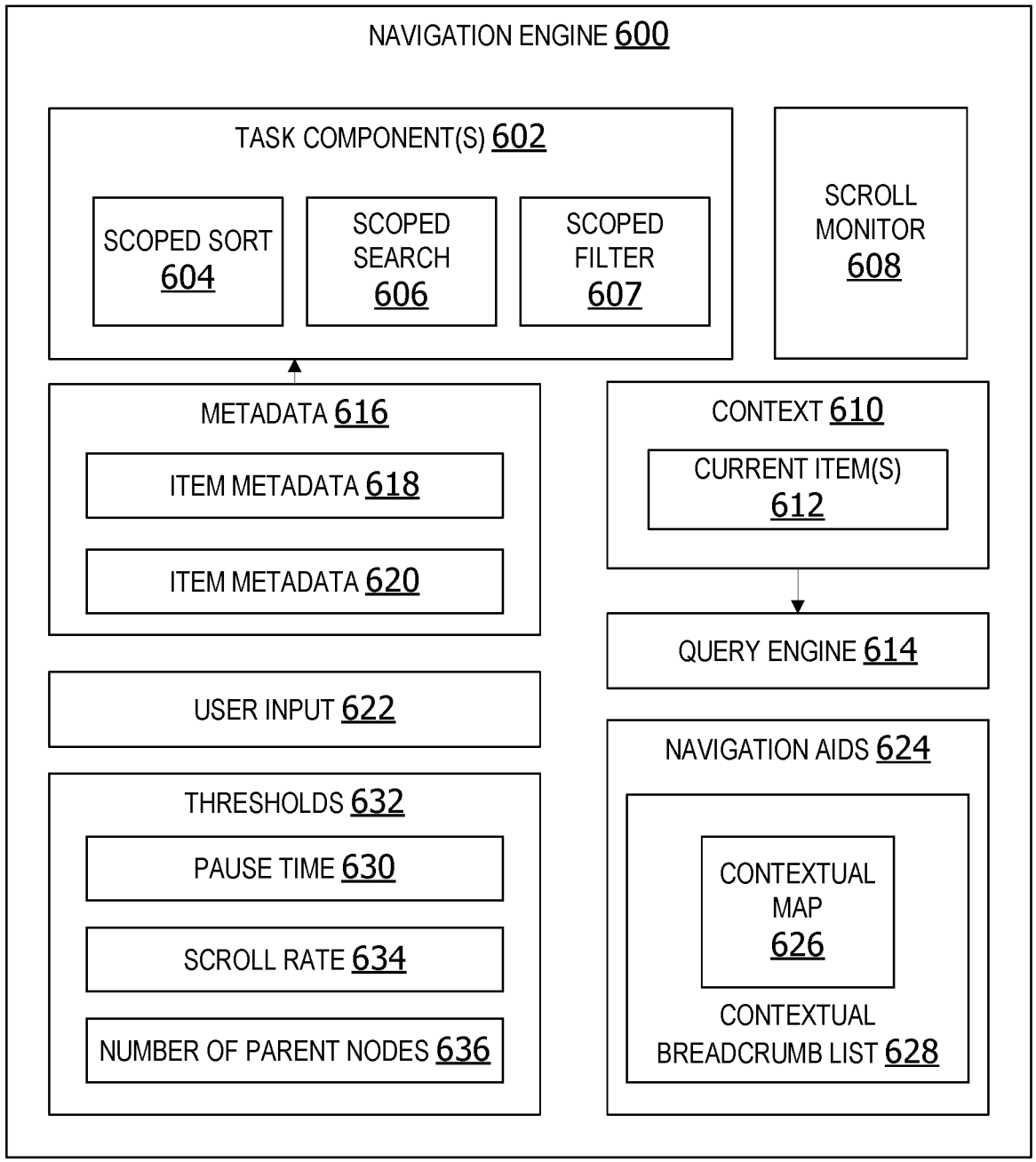
FIG. 6 is an exemplary block diagram of a navigation engine.

FIG. 6 is an exemplary block diagram of a transient scoped navigation engine. The navigation engine 600 in some examples includes task component(s) 602. The task component(s) 602 include a scoped sort 604 component for sorting two or more items at a current level within the hierarchy. The scoped sort 604 component sorts items at the current level of the contextual breadcrumb list in accordance with one or more sort criteria selected by a user. This may be referred to as in-tree sorting. The items may be sorted alphabetically, in order from least-to-greatest, topically, chronologically (e.g., oldest-to-youngest or youngest-to-oldest), by cost (e.g., cheapest-to-most expensive), in numerical order, or in accordance with any other criteria.

The scoped search 606 component searches items at the current level of the contextual breadcrumb list in accordance with one or more search criteria selected by a user. This may be referred to as in-tree searching. The search criteria may include an alphanumeric search term, topics, dates, names, locations, addresses, a symbol, a sound file, an image, or any other type of search criteria.

The scoped filter 607 component filters items at the current level of the contextual breadcrumb list in accordance with one or more user selected filter criteria. This may be referred to as in-tree filtering. The filter criteria may include attributes, age, name, cost, date, time, file type, tag, image, or any other criteria.

A scroll monitor 608 is a component for monitoring user scrolling through the plurality of informational items. The scroll monitor 608 in some examples receives scroll data from a user interface or other input device, such as a mouse, keyboard, touch screen, etc. The scroll monitor 608 determines whether a user is scrolling up, scrolling down, or paused scrolling at a given level within the hierarchy of informational items.

The scroll monitor 608 in some examples determines a rate at which the user is scrolling. In some examples, the scroll rate may refer to how many items the user scrolls through within a given unit of time.

The context 610 is the current level of the hierarchy of informational items. The navigation engine automatically determines the context or current level of the current items 612 being viewed by the user in response to a user scrolling or otherwise navigating through a portion of the hierarchy of informational items.

In some examples, the navigation engine 600 optionally includes a query engine 614. The query engine 614 queries a data storage device for metadata 616 associated with one or more items in the current level, such as item metadata 618 and item metadata 620. The item metadata may be utilized for performing the scoped search, scoped filter, or the scoped sort on one or more item(s). The metadata is optionally retrieved from a data storage device, such as, but without limitation, data storage device 132 in FIG. 1.

The navigation engine 600 receives input 622 from a user. The input 622 indicates if the user is currently navigating through a portion of the hierarchical set of informational items or if the navigation has stopped. The navigation triggers the navigation engine to generate navigation aids.

In some examples, the navigation includes scrolling. The scrolling triggers the navigation engine to generate navigation aids 624, such as the contextual breadcrumb list 628 and/or contextual map 626.

In other examples, the navigation engine 600 generates the contextual breadcrumb list 628 when the user pauses in scrolling at the current item(s) 612 for a threshold pause time 630. The threshold pause time is a pre-determined period of time during which the user stops or slows scrolling enough at a given item or group of informational items in the hierarchical list. In these examples, the scroll monitor 608 automatically identifies the current item(s) 612 displayed when a user stops scrolling for a period of time that exceeds the threshold pause time before the user resumes scrolling. The navigation engine 600 automatically generates and displays the contextual breadcrumb list 628 representing the current item(s) corresponding to the pause in the user scrolling.

In other examples, the navigation engine generates the contextual breadcrumb list when the user pauses walking, moving, or browsing through items in the AR environment. In still other examples, the contextual breadcrumb list is generated based on movements of the user, such as head movement, neck movement, eye movement, hand gestures, finger movements, etc.

The threshold pause time 630 is a pre-determined value in a set of user defined thresholds 632. The set of user defined thresholds 632 may optionally include a threshold scroll rate 634 and/or a threshold number of parent nodes 636 to be included within a contextual breadcrumb list 628 or a transient scroll path.

The threshold scroll rate 634 is a rate or speed with which the user scrolls through a portion of the hierarchical set of informational items. In some examples, the navigation engine 600 automatically generates the contextual breadcrumb list 628 or the transient scroll path when the user scrolls through the current item(s) 612 at a pre-determined speed or rate that is slower than a threshold speed or rate of scrolling. In other words, when a user scrolls at a slower rate than the threshold rate, the scroll monitor 608 identifies the current item(s) corresponding to the slower scroll speed. The navigation engine 600 then generates the contextual breadcrumb list 628 based on the current item(s) viewed by the user at the slower scroll speed.

In other examples, the navigation aids include a transient scroll path. The transient scroll path represents nodes in a path from a parent node to a current node associated with a threshold scroll time or the threshold scroll rate. In other words, a node is added to the transient scroll path if a user stops scrolling at one or more items associated with that node or if the user scroll rate is less than or equal to the threshold scroll rate while viewing the one or more current items. Unlike the contextual breadcrumb list 628 which includes every parent node within a path from a root node to a current node, if a user scrolls quickly through one or more nodes at a rate that exceeds the threshold scroll rate the nodes are not included in the transient scroll path, collapsing the nodes or items in between.

In some examples, the navigation engine determines a user's interest in one or more items within the hierarchical set of informational items based on the rate or speed with which the user scrolls through those items. If a user stopped scrolling to view items at a given level or slowed scrolling to view items, nodes representing these levels are added to the transient scroll path. In other words, the transient scroll path only includes those nodes within the path at which the user paused scrolling or scrolled at a rate equal to or slower than the threshold scroll rate.

This provides the user with indicators representing those nodes of interest while excluding nodes that are of less interest or of no interest as indicated by the user scrolling at a quicker or more rapid rate or without pausing to look at the one or more item(s). In contrast, the contextual breadcrumb list 628 in this example includes every node in the path from the root node to the current level through which the user scrolled regardless of how quickly the user scrolled through the item or whether the user stopped scrolling at any point.

In some examples, the transient scroll path includes an indicator that a representation of one or more nodes in the path from the root node to the current node has been excluded from the transient scroll path. For example, a contextual breadcrumb list representing a path from a root node to the current node at the current level in one example is as follows:

Root node A; parent node B; parent node C; and current node D

In this example, the user paused or slowed scrolling to at or below the threshold scroll rate at the parent node, node C and node D but scrolled quickly through node B without slowing or pausing. Thus, the transient scroll map in this example would include:

Root node A; parent node C; current node D

In the example shown above, only a single node is omitted from the transient scroll path. However, in other examples, any number of nodes may be omitted from the transient scroll path. Moreover, parent node C is italicized to indicate one or more parent nodes have been omitted from the scroll path. The examples are not limited to italicizing. An indicator of an excluded node may include underlining, changing font size, changing font color, adding a dash, adding a space, adding a symbol, adding an icon, adding an alphanumeric, or any other indicator showing one or more parent nodes are excluded from the path.

In some examples, the transient user interface control includes an icon or other control selectable by a user to change the contextual breadcrumb list showing all parent nodes to the transient scroll path showing only those nodes at which the user paused or slowed scrolling. Likewise, a user viewing the transient scroll path in some examples selects the control to change the transient scroll path to the contextual breadcrumb list 628.

In some examples, the user selects a threshold pause time control to select the threshold pause time. In other examples, the user selects a threshold scroll rate control within the transient user interface control to select the threshold scroll rate. In still other examples, the threshold pause time and the threshold scroll rate are pre-determined, default threshold values rather than user defined threshold values.

In other examples, the contextual breadcrumb list 628 may include only two nodes, dozens of nodes, or even hundreds of nodes representing levels within the hierarchy from the root node to the current node. If the contextual breadcrumb list 628 is too long to view all nodes within the display, the transient user interface optionally includes a transient scroll bar enabling a user to scroll through the contextual breadcrumb list 628.

For example, if a contextual breadcrumb list 628 includes fifteen nodes and only ten nodes fit within the current display space, the user utilizes a transient scroll bar within the transient user interface control to scroll up and down or scroll left and right through the nodes within the contextual breadcrumb list. As the user scrolls in one direction, the contextual breadcrumb list displays nodes moving up through the hierarchy towards the root node. As the user scrolls in the opposite direction, the contextual breadcrumb list displays nodes moving down through the hierarchy towards the current level. A transient scroll bar may be oriented to scroll up and down, as well as scrolling left-to-right.

However, in still other examples, the contextual breadcrumb list 628 only includes a threshold number of parent nodes 636 representing a path from the current level to one or more parent nodes. If the threshold number of parent nodes is six and a path from the current node to the root node is ten nodes, the contextual breadcrumb list 628 only includes the six nodes starting from the current level up to the fifth parent node while excluding the root node. In other words, the contextual breadcrumb list 628 does not include the root node and other parent nodes exceeding the threshold number. Utilizing the threshold number of parent nodes 636 to be included within a contextual breadcrumb list or a transient scroll path enables a portion of a long chain of nodes in a path to be displayed within the transient user interface control without a transient scroll bar.

In some examples, the transient user interface control includes an icon or user selectable control to enable a user to select or set the threshold number of parent nodes 636 or to disable the threshold number of parent nodes. For example, a user selects the control to display only a given threshold number of parent nodes within the contextual breadcrumb list or transient scroll path. In other examples, the user selects the control to disable the threshold number of parent nodes and restore the contextual breadcrumb list or transient scroll path to include every node in the path from the current node to the root node.

In some examples, the threshold number of nodes is a user-defined number selected by the user dynamically during viewing of the hierarchical set of informational items. In still other examples, the threshold number of nodes is a default threshold number of nodes.

Figure 7:
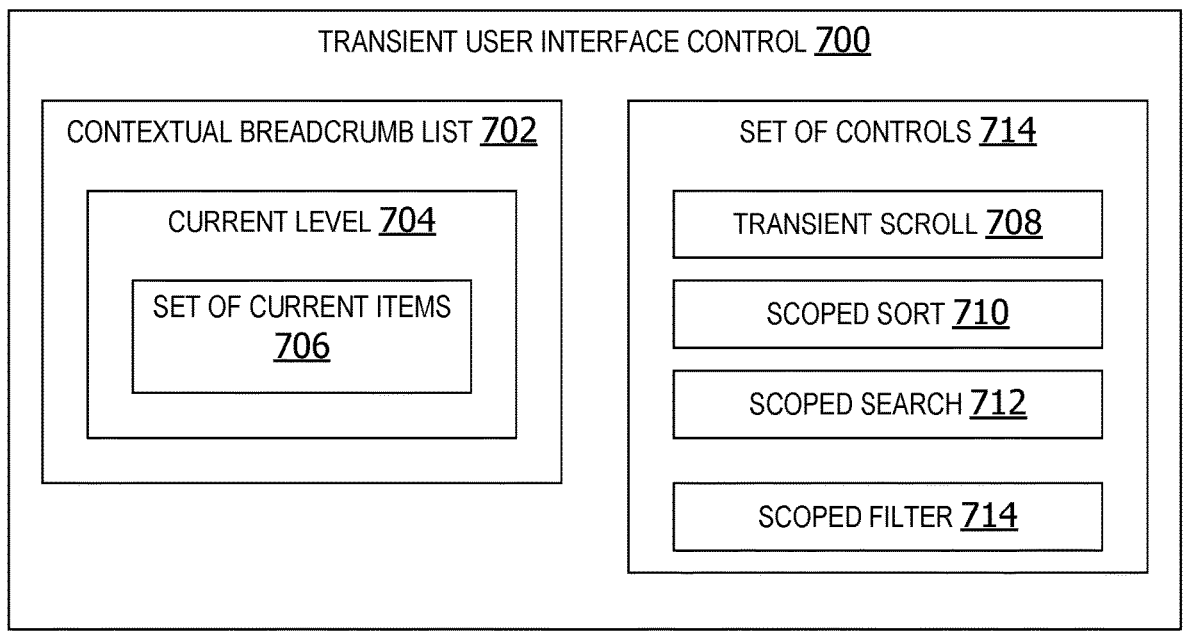
FIG. 7 is an exemplary block diagram of a transient user interface control.

FIG. 7 is an exemplary block diagram of a transient user interface control. The transient user interface control 700 is presented to a user via a display or FOV generated by an AR device. The FOV may include a projected image, an image on a screen, a holographic image, or any other type of display.

In some examples, the transient user interface control 700 is always displayed within the field of view of the user. In other examples, the transient user interface control is only displayed some of the time. In these examples, the transient user interface control may be hidden, collapsed, or otherwise outside the field of view of the user for a given period of time. In these examples, a user selects to view the transient user interface control by selecting an icon, making a verbal command, turning their head, looking up, making a gesture, pushing a physical control, or otherwise performing an action to initiate display of the transient user interface control 700.

The contextual breadcrumb list 702 is displayed within the transient user interface control. In some examples, the entire contextual breadcrumb list 702 is displayed within the field of view. In other examples, the contextual breadcrumb list 702 is only partially displayed. For example, in the AR environment, the visual space may be limited. The contextual breadcrumb list 702 may be partially hidden or only partially visible within the FOV. In such cases, one or more nodes of the contextual breadcrumb list are not visible to the user. A partially visible contextual breadcrumb list only provides a view of a portion of the nodes.

In one example, a partially visible contextual breadcrumb list includes only the first three nodes within a same level. In another example, a partially visible contextual breadcrumb list provides a visual view of only the middle ten nodes within the same level of the hierarchy. The nodes at the beginning and end of the breadcrumb list are collapsed or otherwise not within the FOV.

In other examples, the contextual breadcrumb list is completely obscured, completely collapsed, or otherwise not visible within the FOV of the user. In such examples, the user can select a control or perform an action to open the contextual breadcrumb list for display of the contextual breadcrumb list in its entirety or display a portion of the contextual breadcrumb list. The contextual breadcrumb list in these examples may be represented by a visible icon or a non-visual indicator, such as an audible sound.

In one example, a user may tap an icon, speak a verbal command, or take some other action to initiate expansion of the collapsed contextual breadcrumb list. Upon expansion, the contextual breadcrumb list is displayed in whole or in part within the FOV of the user.

In other examples, the contextual breadcrumb list is presented to a user in whole or in pat via an audio format. For example, a speech emulator associated with the AR device may provide an audible description of items or read the contextual breadcrumb list in whole or in part to the user via a text-to-speech emulator or other speech synthesizer for providing data to the user in an audible format. In one example, a user makes verbal requests for information regarding the user's current location within the AR environment, current level within the hierarchy, or items in the breadcrumb list. The AR device in this example responds by providing the breadcrumb list in natural language.

The set of control 714 are user interface controls for performing actions on the contextual breadcrumb list and/or a portion of the items in the hierarchical set of informational items being viewed by the user. The set of controls 714 in this non-limiting examples includes a transient scroll 708 control for scrolling through the nodes representing each parent node in the path from the root node to the set of current items 706 at the current level 704. The set of current items 706 may include a single item as well as a group of two or more items at a current level 704 within the hierarchy. A user scrolls up or down through the contextual breadcrumb list or a transient scroll path using the transient scroll 708.

The scoped sort 710 is a control for performing a sort on the set of current items 706. The user utilizes the scoped sort 710 control to initiate a sort of informational items within the context of the current level based on one or more sort criteria.

The scoped search 712 control initiates a search on the set of current items 706 in the current level 704 using one or more search criteria. The search is performed only on the items in the current level in some examples. In other examples, the scoped search is performed on items at the current level and items nested within the set of current items 706.

The scoped filter 714 is a control for user selection of the scoped filter action. The scoped filter control initiates a filter of a set of informational items at the current level in accordance with one or more user selected filter criteria.

Figure 8:
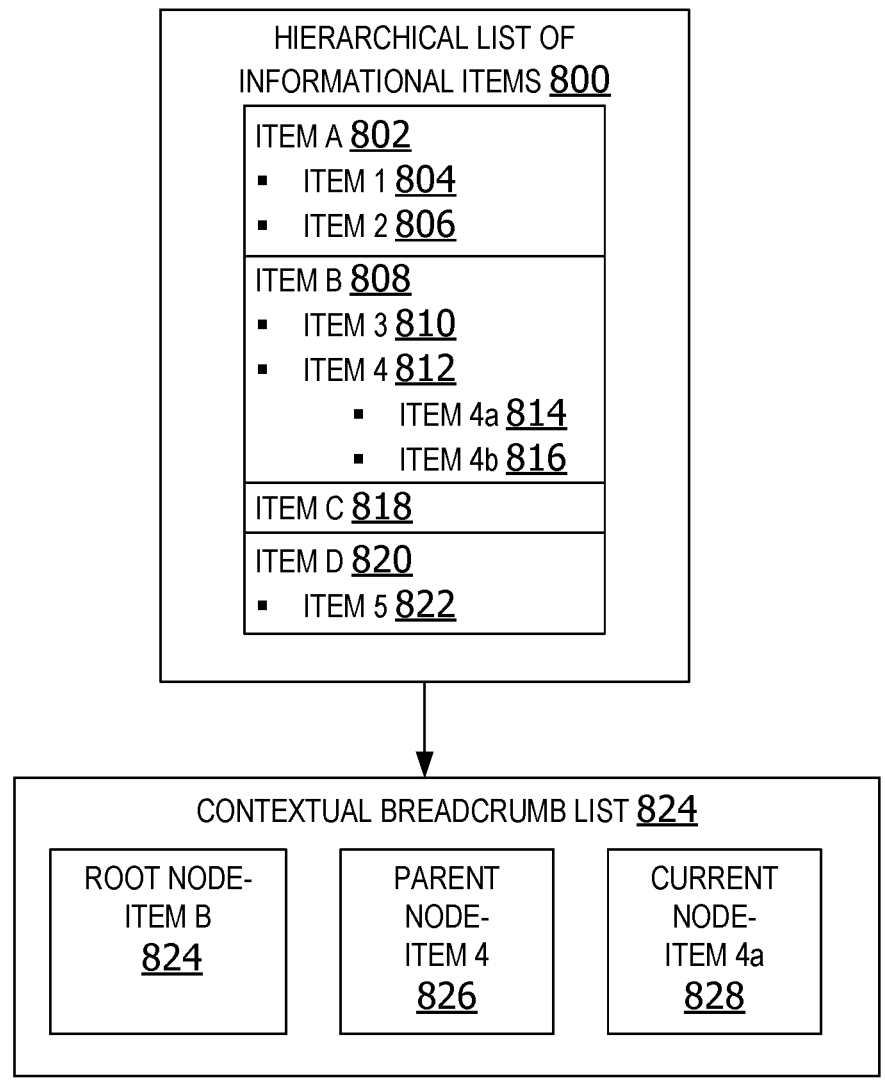
FIG. 8 is an exemplary block diagram of a contextual breadcrumb list.

FIG. 8 is an exemplary block diagram of a contextual breadcrumb list. The hierarchical list of informational items 800 in this example includes item A 802, item B 808, item C 818, and item D 820 at a first level. The item A 802 includes nested items 804 and 806 at a second level. Item B 808 includes nested items 810 and 812 at a second level. Item C 818 includes no nested items. Item D 820 includes a single nested item 822.

In this example, nested item 812 includes nested items 814 and 816 at the third level. If a user scrolls through a portion of the hierarchical list following a path from item B 808 to item 812 and then to item 814, the navigation engine automatically generates a contextual breadcrumb list 824 representing that temporary path through which the user currently scrolled. Alternatively, the user may walk through a portion of the AR environment browsing or looking at item B 808, item 812, and item 814. In this example, the navigation engine automatically generates a contextual breadcrumb list 824 representing that temporary "browsing" path representing the items the user is currently browsing. In both of these examples, the contextual breadcrumb list 824 includes a parent node 826 representing item 808 at the first level, a parent node 826 representing the parent item 812 at the second level, and a current node 828 representing the current set of informational items being viewed at the third level (items 814, 816).

In these examples, items 802, 808, 818, and 820 are siblings on a same level. Likewise, items 810 and 812 are siblings on a same level within the hierarchy. Items 814 and 816 are also siblings on a same level.

In this example, if the user navigates through a different portion of the hierarchical list of informational items 800 to view a new set of current items, the contextual breadcrumb list automatically updates to include a new set of nodes representing the path from a root node to the new set of current items.

Similarly, in another example, if the user walks to a different area within the AR environment to view a new set of current items, the contextual breadcrumb list automatically updates to include a new set of nodes representing the path from a root node to the new set of current items being viewed in the FOV.

In this example, the user flexibly and quickly navigates the hierarchical tree of informational items by going up the hierarchy or between siblings in the same hierarchy via a different interaction with the contextual breadcrumb list 824. For example, a user selects a node in the contextual breadcrumb list 824 to navigate directly to the level within the hierarchy represented by the selected node. The selection of one or more nodes in the contextual breadcrumb list changes the items being displayed within the hierarchical list of informational items. For example, if a user selects a root node in the contextual breadcrumb list, the hierarchical list of informational items being displayed to the user will automatically change from the portion of the list of informational items at the current item 816 back to the portion of the hierarchical list of informational items at the first level containing item B 808. If the user selects parent node 826 in the transient user interface control, the display changes to present the portion of the list of informational items at the second level associated with item 812. In this manner, the user utilizes the contextual breadcrumb list to navigate through the hierarchical list of informational items 800 with improved ease and efficiency.

FIG. 9 is an exemplary block diagram of a transient user interface control presented in response to a user scroll down. The FOV 900 in this example includes a portion of a hierarchical list of informational items beginning with an entry for "kale" and ending with an entry for "Grapefruit". The remaining portions of the hierarchical list of informational items are not viewable until the user scrolls up or scrolls down to change the items currently being displayed.

The transient user interface control 902 includes a node 904 for the parent node "food" and a current node 906 for the item "vegetables". The item fruit is a sibling on the same level as the item vegetables. As the user scrolls down 910 using the scroll bar 908, the currently viewed items change and the transient user interface control automatically updates to display a contextual breadcrumb list for the current items being viewed. The item vegetable includes nested items 912.

As the user scrolls down past the vegetables to display nested items 916 contained within the item 914 "fruit", the breadcrumb list is automatically updated to replace the current node 906 "vegetables" with a new current node "fruit". The update occurs without the user selecting vegetables, fruit, or any other item being displayed within the hierarchical tree of informational items.

In this example, the transient user interface control is provided above the hierarchical list of informational items. However, in other examples, the transient user interface control is provided at the bottom of the display, along the side of the display, within a split-screen area, or in any other portion of the display.

FIG. 10 is an exemplary block diagram of a transient user interface control presented in response to a user scroll up action. In this example, the display 1000 within the FOV includes nested item 1002 which are not being scrolled through. The items 1002 which are not being scrolled through are excluded from the contextual breadcrumb list 1018.

The currently viewed item poultry 1006 nested within the item meat 1004 is included within the contextual breadcrumb list 1018. In this example, the user was viewing items 1012 nested within the item red meat 1010 prior to scrolling up 1016 using scroll bar 1014. As the user scrolls up from red meat 1010 to poultry 1006, the contextual breadcrumb list 1018 automatically updates to include nodes representing items within the current level of informational items that is being viewed.

In this non-limiting example, the contextual breadcrumb list 1018 is included in a transient user interface control at the bottom of the display in an area below the hierarchical list of informational items. In other examples, the contextual breadcrumb list 1018 may be displayed above the list, to the side, or any other portion of the display.

FIG. 11 is an exemplary block diagram of a scoped search icon and scoped sort icon associated with a transient user interface control. The display 1100 within the FOV in this example includes a transient user interface control providing a root node representing the current level being viewed by the user. The transient user interface control includes a number of informational items in the current level 1106, a scoped search control 1108, a scoped sort control 1110, a transient scroll bar 1118 enabling a user to scroll through the contextual breadcrumb list from the first entry 1112 to the last entry 1114 nested within the item food 1104 without utilizing the scroll bar.

In this example, the list of informational items is sorted alphabetically using the sort control. The user quickly navigates the sorted list via a control, such as controls 1112, 1114, and/or 1118.

FIG. 12 is an exemplary block diagram of a scoped search bar associated with a transient user interface control. The display 1200 within the FOV in this non-limiting example includes a portion of a hierarchical list of informational items 1202 being viewed. The contextual breadcrumb list includes a root node representing the current level of the items 1202 being viewed.

The scoped search 1206 bar is a control for entering one or more search terms. When a user enters a search term, the search is conducted within the food 1204 item. In other words, only items nested within food 1204 are searched using the entered search criteria. If a user enters the search criteria "cucumber", the items nested within food 1204 will be searched. In this example, an item "cucumber" would be returned by the search.

Clicking on the result jumps the display to the first match. If there are multiple matches, a control enables the user to move between the different search results. Selecting each search result moves the display to the search result item in the hierarchical list of informational items.

Figure 13:
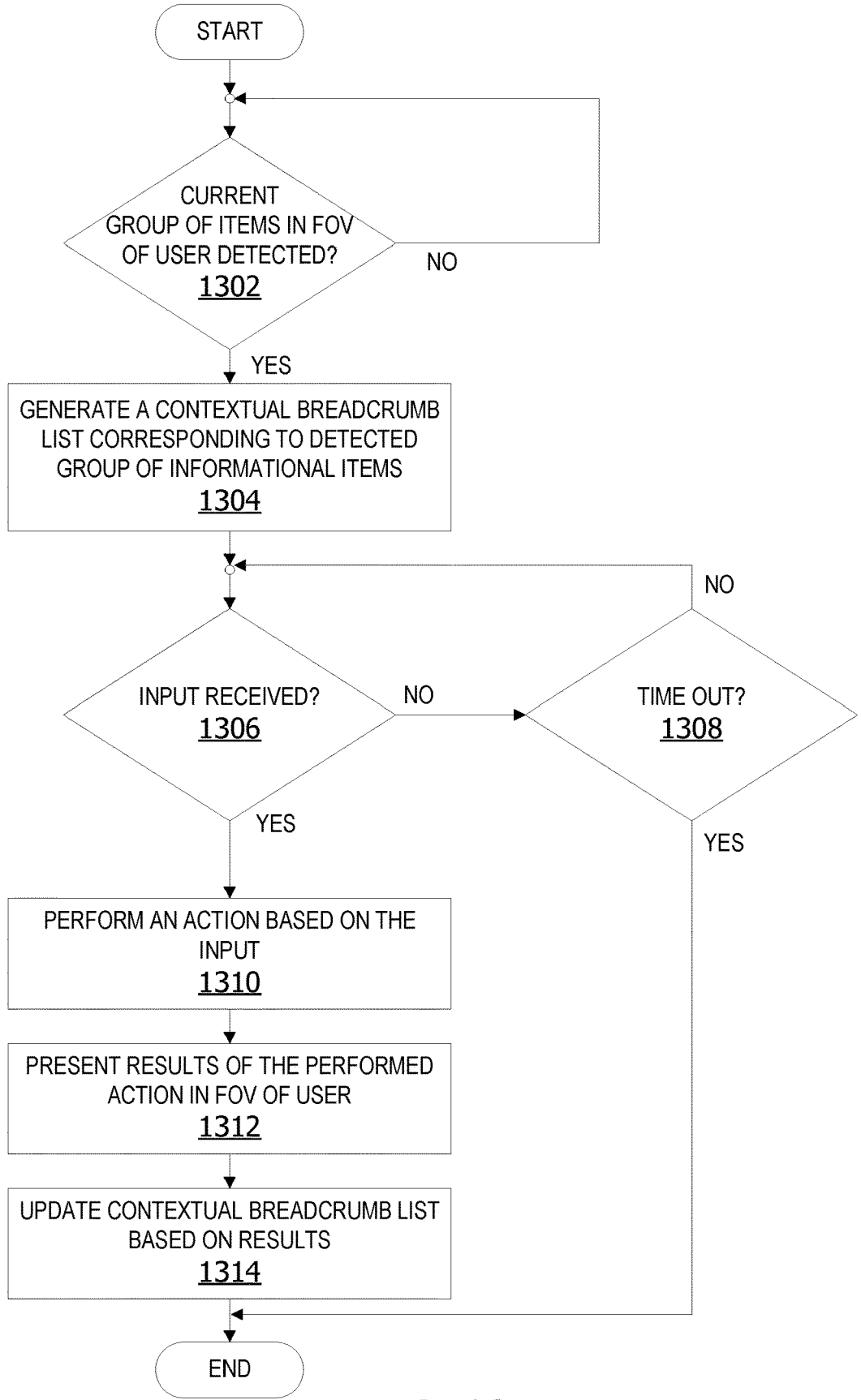
FIG. 13 is an exemplary flow chart illustrating operation of a navigation engine to perform an action associated with a transient user interface control.

FIG. 13 is an exemplary flow chart illustrating operation of a navigation engine to perform an action associated with a transient user interface control. The process shown in FIG. 13 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 13 is not limited to a computing device. One or more computer-readable storage media storing computer-readable instructions may execute to cause at least one processor to implement the operations illustrated in FIG. 13.

A determination is made as to whether a current group of informational items displayed to a user in a FOV is detected at 1302. If yes, a contextual breadcrumb list corresponding to the detected group of informational items is generated at 1304. A determination is made as to whether input is received from a user at 1306. If no, a determination is made as to whether a time out has occurred at 1308. If the time out has occurred, the process terminates or suspends thereafter.

If input is received at 1306, an action is performed based on the input at 1310. The results of the performed action are presented for display within the FOV to the user at 1312. The contextual breadcrumb list is updated based on the results at 1314. The process terminates or suspends thereafter.

While the operations illustrated in FIG. 13 are described as being performed by an AR device, aspects of the disclosure contemplate that performance of the operations by other entities. For example, a cloud service may perform one or more of the operations.

Figure 14:
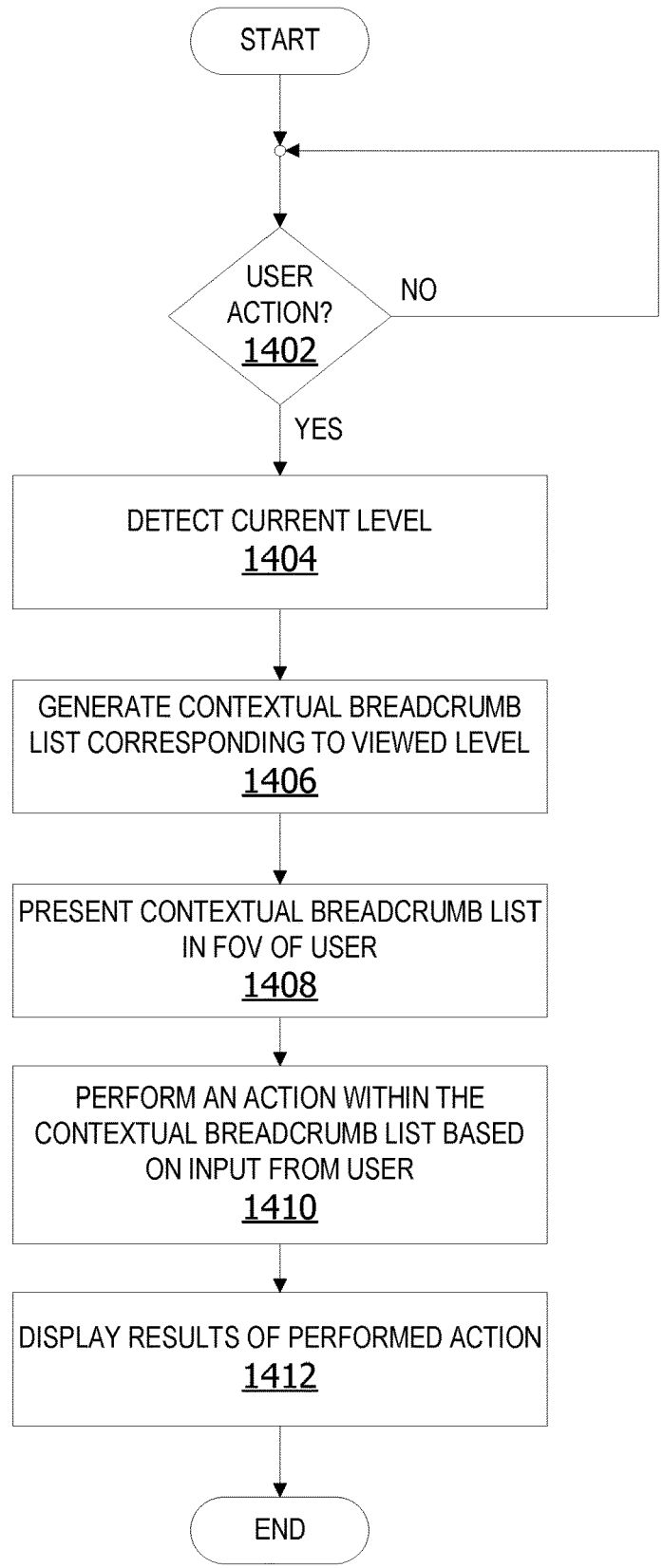
FIG. 14 is an exemplary flow chart illustrating operation of a navigation engine to generate a contextual breadcrumb list.

FIG. 14 is an exemplary flow chart illustrating operation of a navigation engine to generate a contextual breadcrumb list. The process shown in FIG. 14 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 14 is not limited to a computing device. One or more computer-readable storage media storing computer-readable instructions may execute to cause at least one processor to implement the operations illustrated in FIG. 14.

While the operations illustrated in FIG. 14 are described as being performed by an AR device, aspects of the disclosure contemplate that performance of the operations by other entities. For example, a cloud service may perform one or more of the operations.

A determination is made as to whether a user is scrolling through a list of informational items at 1402. If yes, a current level is detected at 1404. A contextual breadcrumb list corresponding to the viewed level is generated at 1406. The contextual breadcrumb list is presented for display within FOV of the user at 1408. An action is performed within the contextual breadcrumb list based on input from the user at 1410. The results of the performed action are displayed to the user at 1412. The process terminates or suspends thereafter.

Figure 15:
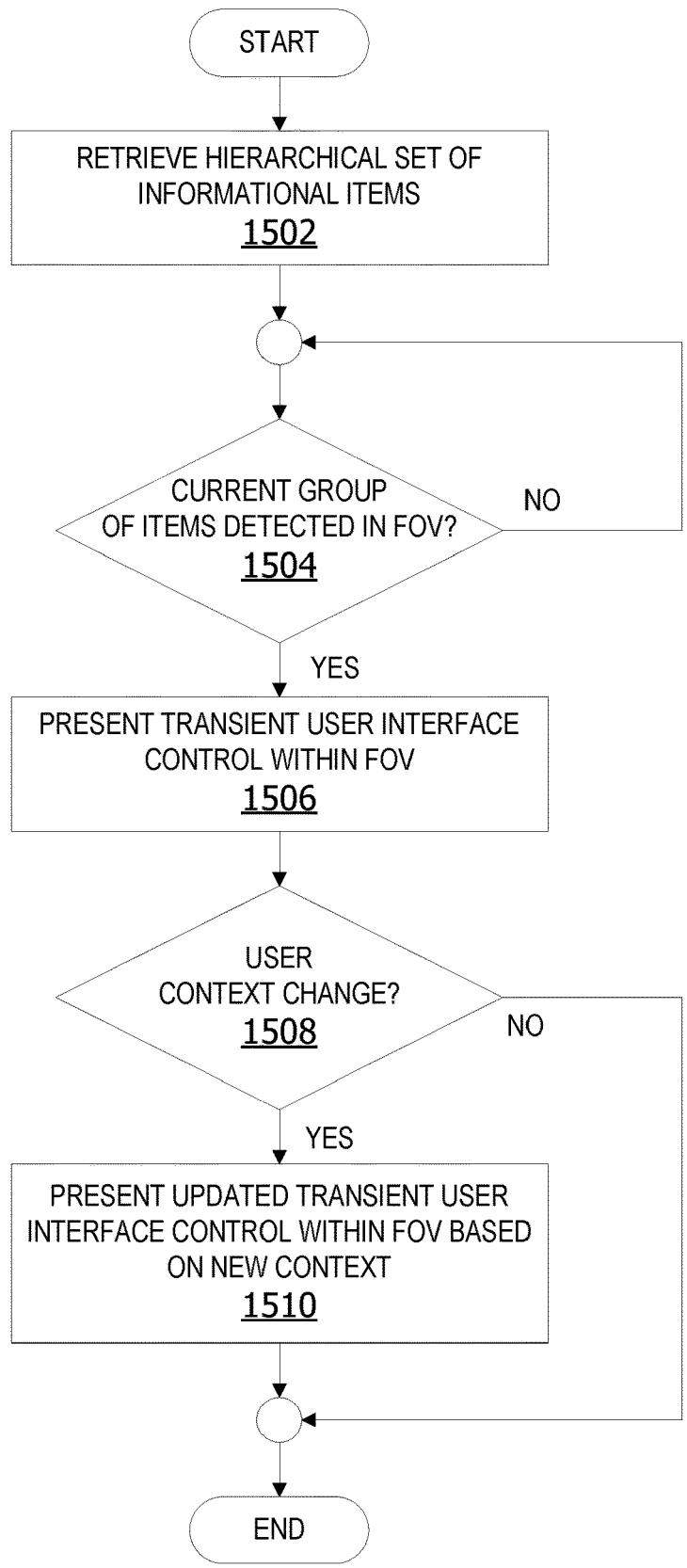
FIG. 15 is an exemplary flow chart illustrating operation of a navigation engine to generate a transient scroll path based on a user scrolling through a hierarchical set of informational items.

FIG. 15 is an exemplary flow chart illustrating operation of a navigation engine to generate a transient user interface based on a user context. The process shown in FIG. 15 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 15 is not limited to a conventional computing device (e.g., execution may be performed by a dedicated circuit or another execution modality). One or more computer-readable storage media storing computer-readable instructions may execute to cause at least one processor to implement the operations illustrated in FIG. 15.

A hierarchical set of informational items is retrieved at 1502. A determination is made as to whether a current group of items is detected in the FOV of the user at 1504. If yes, the transient user interface control is presented within the FOV at 1506. A determination is made as to whether a user context is changed at 1508. If yes, an updated transient user interface control is presented within the FOV based on the new context at 1510. The process terminates or suspends thereafter.

While the operations illustrated in FIG. 15 are described as being performed by an AR device, aspects of the disclosure contemplate that performance of the operations by other entities. For example, a cloud service may perform one or more of the operations.

Figure 16:
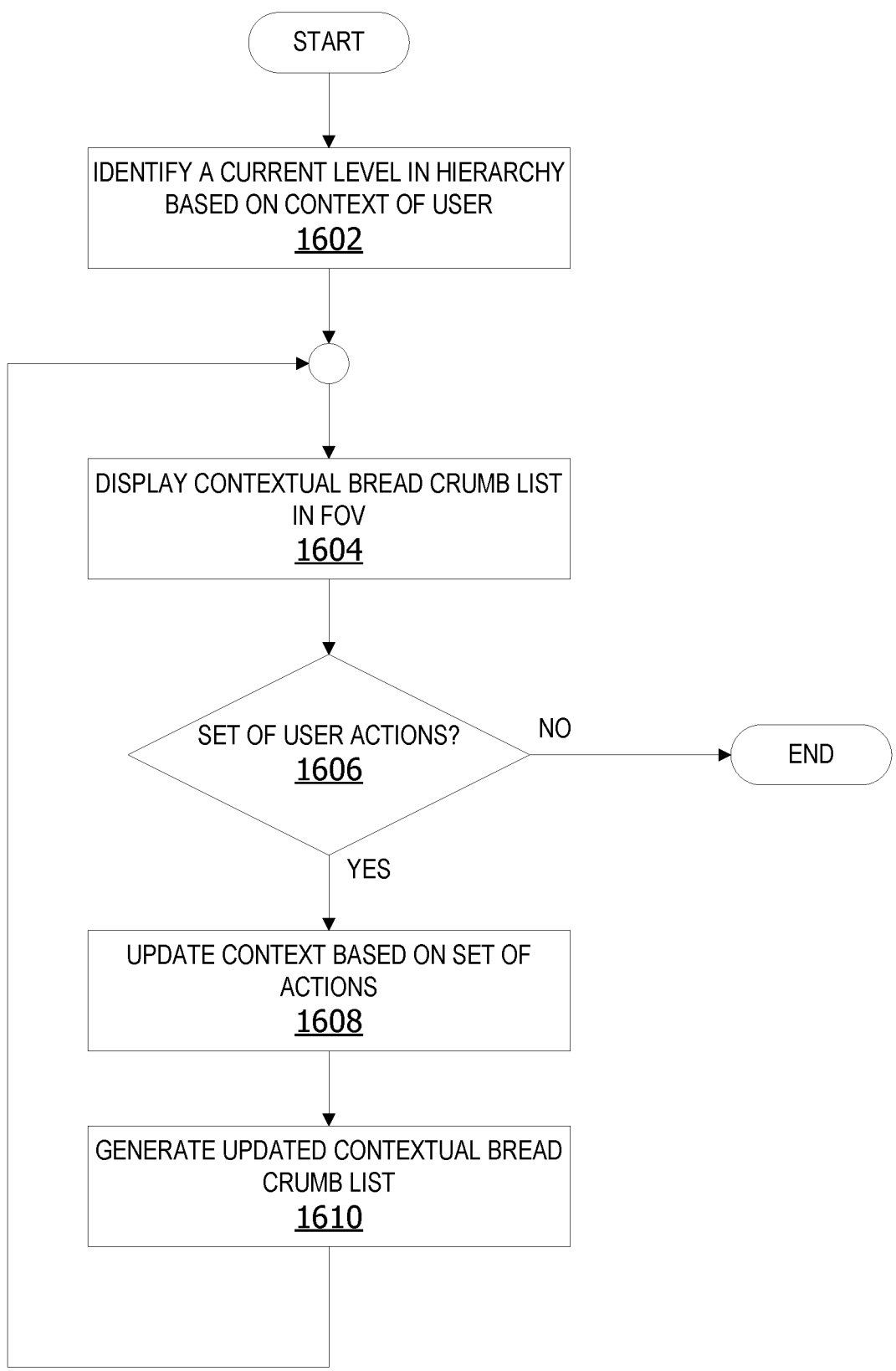
FIG. 16 is an exemplary flow chart illustrating operation of a navigation engine to update a contextual breadcrumb list.

FIG. 16 is an exemplary flow chart illustrating operation of a navigation engine to update a contextual breadcrumb list. The process shown in FIG. 16 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 16 is not limited to a computing device. One or more computer-readable storage media storing computer-readable instructions may execute to cause at least one processor to implement the operations illustrated in FIG. 16.

A current level in a hierarchy is identified based on context of a user at 1602. A contextual breadcrumb list is displayed within a FOV of a user by an AR device at 1604. A determination is made as to whether a set of user actions occurs at 1606. If no, the process terminates or suspends thereafter.

If a set of user actions occurs at 1606, the context of the user is updated based on the set of actions at 1608. An updated contextual breadcrumb list is generated at 1610. The updated contextual breadcrumb list is displayed in the FOV at 1604. The process performs operations 1604 through 1606 until no additional user actions are detected at 1606. The process terminates or suspends thereafter.

In this example, the user context is utilized to create a contextual breadcrumb list. In other examples, the context is utilized to create a contextual map for display within the FOV.

While the operations illustrated in FIG. 16 are described as being performed by an AR device or a server, aspects of the disclosure contemplate that performance of the operations by other entities. For example, a cloud service may perform one or more of the operations.

Figure 17:
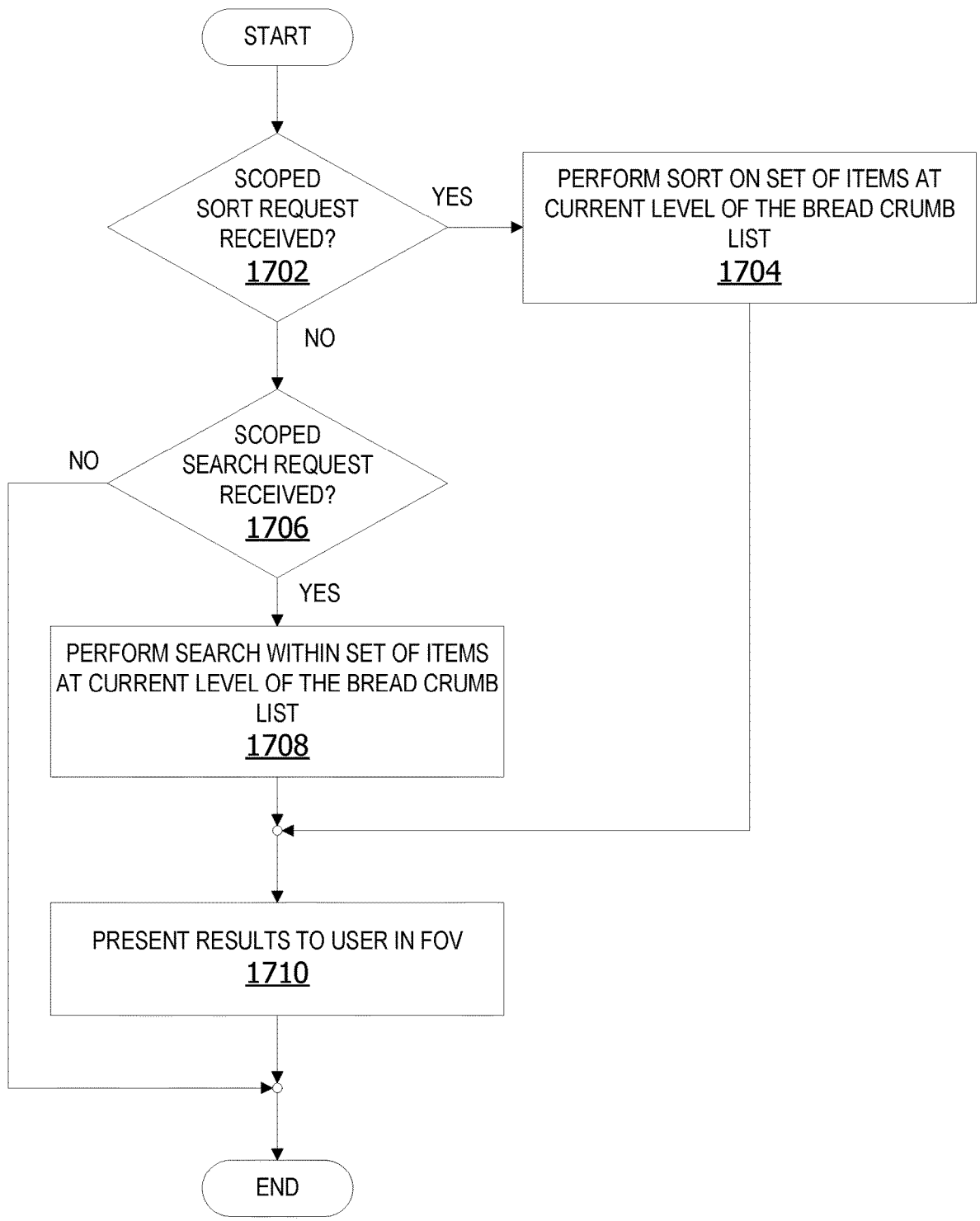
FIG. 17 is an exemplary flow chart illustrating operation of a navigation engine to perform a scoped search and scoped sort within a current level of a contextual breadcrumb list.

FIG. 17 is an exemplary flow chart illustrating operation of a navigation engine to perform a scoped search and scoped sort within a current level of a contextual breadcrumb list. The process shown in FIG. 17 may be performed by a navigation engine running on a computing device, such as, but not limited to, navigation engine 118 in FIG. 1, navigation engine 216 in FIG. 2 or navigation engine 600 in FIG. 6. Further, execution of the operations illustrated in FIG. 17 is not limited to a computing device. One or more computer-readable storage media storing computer-readable instructions may execute to cause at least one processor to implement the operations illustrated in FIG. 17.

A determination is made as to whether a scoped sort request is received at 1702. If yes, the sort is performed on the set of informational items at a current level of the contextual breadcrumb list at 1704. A determination is made as to whether a scoped search request is received at 1706. If yes, a search is performed within the set of informational items at the current level of the breadcrumb list at 1708. The results are sent to the user for display to user within the FOV at 1710. The process terminates or suspends thereafter.

While the operations illustrated in FIG. 17 are described as being performed by an AR device, aspects of the disclosure contemplate that performance of the operations by other entities. For example, a cloud service may perform one or more of the operations.

Additional Examples

In some examples, a system is provided that includes a memory storing data corresponding to a hierarchical set of informational items and one or more processors programmed to automatically detect a current level in the hierarchical set of informational items in response to a user scrolling through the hierarchical set of informational items, the current level comprising at least one group of informational items; generate a contextual breadcrumb list representing a path from at least one parent node in the hierarchical set of informational items to the detected current level; present the contextual breadcrumb list and a transient user interface control for display to the user via at least one display device, a scope of the transient user interface control being adjusted based on the detected current level; perform an action on the at least one group of informational items within the detected current level based on input received from the user via the presented transient user interface control; and present, for display, results of the performed action.

In another example scenario, one or more computer storage media embodying computer-executable components are provided. The components include a navigation engine component that when executed, causes at least one processor to automatically detect a current level in a hierarchical set of informational items in response to a change in a context associated with at least one portion of the hierarchical set of informational items viewed by a user and generate a contextual breadcrumb list representing a path from a root node in the hierarchical set of informational items to the detected current level; a transient user interface control component, that when executed, causes the at least one processor to display the contextual breadcrumb list and a set of controls to the user; and a transient filter component, that when executed, causes the at least one processor to perform an action including a search or sort of at least one group of informational items within the detected current level based on input received from the set of controls associated with the transient user interface control and present results of the performed action for display to the user.

Alternatively, or in addition to the other examples described herein, examples include any combination of the following:

- the action is a scoped sort action, wherein the one or more processors are programmed to perform the scoped sort action on the at least one group of informational items in response to the user selecting at least one sort criteria;
- the action is a scoped filter action, wherein the one or more processors are programmed to perform the scoped filter action on the at least one group of informational items in response to the user selecting at least one filter criteria;
- the action is a scoped search action performed on the at least one group of informational items, wherein the one or more processors are programmed to perform a search within the at least one group of informational items in response to the user selecting at least one search criteria;
- automatically detect the current level based on one or more items visible within the FOV of the user;
- automatically detect a new current level in the hierarchical set of informational items in response to the user moving through the augmented reality environment;
- update the contextual breadcrumb list, wherein the updated contextual breadcrumb list represents a path from at least one parent node in the hierarchical set of informational items to the new current level;
- display the updated contextual breadcrumb list and the transient user interface control within the FOV of the user;
- generate the contextual breadcrumb list based on the input received from the wearable augmented reality device, wherein a remote computing device sends the contextual breadcrumb list to the wearable augmented reality device for display to the user via a network;
- automatically detect a current group of informational items within a current FOV of a user associated with an augmented reality environment, the augmented reality environment comprising a plurality of groups of informational items;
- display a transient user interface control directed to the detected current group of informational items within the FOV generated by the augmented reality device;
- perform an action, by a task component, on the detected current group of informational items based on input received from the user via the presented transient user interface control;
- present a result of the performed action for display in a FOV;
- receive the input indicating the user selection of a sort control associated with the transient user interface control;
- sort items within the detected current group of informational items based on at least one sort criteria, wherein items within the current group of informational items are sorted, and wherein items within the plurality of groups of informational items that are excluded from the current group of informational items remain unsorted;
- receive the input indicating the user selection of a filter control associated with the transient user interface control;
- filter the detected current group of informational items based on at least one criteria, wherein items within the plurality of groups of informational items that are excluded from the current group of informational items are excluded from the filtering;
- receive the input indicating the user selection of a search control associated with the transient user interface control;
- perform a search on the detected current group of informational items based on at least one search criteria, wherein items within the plurality of groups of informational items that are excluded from the current group of informational items are excluded from the search;
- automatically detect a change in a context of the plurality of groups of informational items, wherein the change in context comprises a user walking through the augmented reality environment;
- generate a contextual breadcrumb list representing a path from a root node in the hierarchical set of informational items to the current group of informational items;
- display the generated contextual breadcrumb list and the transient user interface control to the user within the FOV;
- retrieve a contextual map associated with at least a portion of the augmented reality environment associated with a current location of the user, wherein the contextual map comprises an indicator identifying the current location of the user relative to at least one feature of interest within the portion of the augmented reality environment;
- automatically detect a new current level in the hierarchical set of informational items in response to a user movement changing the FOV to include a different portion of the hierarchical set of informational items;
- present an updated transient user interface control directed to the new current level within the current FOV generated by the augmented reality device;
- automatically identify a current level in a hierarchical set of informational items within an augmented reality environment in response to detecting a change in a context associated with at least one portion of the hierarchical set of informational items presented within a FOV of a user by an augmented reality device and a contextual breadcrumb list within the FOV, the contextual breadcrumb list representing a path from a root node in the hierarchical set of informational items to the detected current level;
- display the contextual breadcrumb list and a set of controls within the FOV;
- perform an action on at least one group of informational items within the detected current level based on input received via the set of controls associated with the transient user interface control and present results of the performed action for display to the user;
- the hierarchical set of informational items includes transcribed text of at least a portion of a conversation associated with at least one topic of conversation;

the change in the context comprises a user moving through at least a portion of the augmented reality environment to change at least one item displayed within the FOV;

the action performed by the task component includes at least one of a transient sort, a transient search, or a transient filter performed within the current context based on at least one criteria;

receive input from a transient user interface control associated with the augmented reality device via a network; perform the action based on the input; and send results of the performed action to the transient user interface control associated with the augmented reality device via the network; and receive navigation aids, including the contextual breadcrumb list, from a navigation engine associated with a remote computing device via a network; and display the navigation aids to the user via the FOV generated by the augmented reality device, the navigation aids corresponding to the hierarchical set of informational items.

At least a portion of the functionality of the various elements in FIG. 1, FIG. 2, FIG. 3, FIG. 6, and FIG. 7 may be performed by other elements in FIG. 1, FIG. 2, FIG. 3, FIG. 6, and FIG. 7, or an entity (e.g., processor, web service, server, application program, computing device, etc.) not shown in FIG. 1, FIG. 2, FIG. 3, FIG. 6, and FIG. 7.

In some examples, the operations illustrated in FIG. 13, FIG. 14, FIG. 15, FIG. 16, and FIG. 17 may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for providing navigation aids. For example, the elements illustrated in FIG. 1, FIG. 2, FIG. 3, FIG. 6, and FIG. 7, such as when encoded to perform the operations illustrated in FIG. 13, FIG. 14, FIG. 15, FIG. 16, and FIG. 17, constitute exemplary means for intelligent navigation of a hierarchical set of informational items associated with an AR environment; exemplary means for retrieving a hierarchical set of informational items associated with a set of user actions performed within an augmented reality environment; exemplary means for generating a contextual breadcrumb list representing a path from at least one parent node in the hierarchical set of informational items to a detected current level within the hierarchical set of informational items; presenting the contextual breadcrumb list and a transient user interface control for display within a field of view (FOV) of a user via the augmented reality generation system, a scope of the transient user interface control being adjusted based on the detected current level; exemplary means for performing an action on at least one group of informational items within the hierarchical set of informational items based on input received from the user via the presented transient user interface control; and exemplary means for presenting results of the performed action within the FOV.

In another example, the elements illustrated in FIG. 1, FIG. 2, FIG. 3, FIG. 6, and FIG. 7, such as when encoded to perform the operations illustrated in FIG. 13, FIG. 14, FIG. 15, FIG. 16, and FIG. 17, constitute exemplary means for automatically detecting a current group of informational items within a current FOV of a user associated with an augmented reality environment, the augmented reality environment comprising a plurality of groups of informational items; exemplary means for displaying a transient user interface control directed to the detected current group of informational items within the FOV generated by the augmented reality device; exemplary means for performing an action, by a task component, on the detected current group of informational items based on input received from the user via the presented transient user interface control; and exemplary means for presenting a result of the performed action within an FOV for display.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An augmented reality system for generating an augmented reality environment comprising a partial real-world reality and a partial virtual reality, the augmented reality system comprising:
    a memory storing a navigation engine; and
    one or more processors programmed to:
        identify a first item in the real-world reality within the field of view (FOV) of a user;
        based at least on the identified first item, automatically infer a hierarchical set of informational items;
        identify a second item in the real-world reality that is currently within the FOV of the user:
        based at least on the identified first item and the identified second item, generate a contextual breadcrumb list representing a path from at least one parent node in the hierarchical set of informational items to a level within the hierarchical set of informational items comprising the second item;
        present the contextual breadcrumb list and a transient user interface control for display within the FOV of a user via the augmented reality generation system, a scope of the transient user interface control being adjusted based on the level comprising the second item:
        perform an action on at least one group of informational items within the hierarchical set of informational items based on input received from the user via the presented transient user interface control; and
        present, for display, results of the performed action.

2. The augmented reality system of claim 1, wherein the action is a scoped sort action, wherein the one or more processors are programmed to perform the scoped sort action on the at least one group of informational items based on at least one sort criteria.

3. The augmented reality system of claim 1, wherein the hierarchical list includes real world items previously seen in the FOV.

4. The augmented reality system of claim 1, wherein the action is a scoped search action performed on the at least one group of informational items, wherein the one or more processors are programmed to perform a search within the at least one group of informational items based on a t least one search criteria.

5. The augmented reality system of claim 1, wherein the processor is further programmed to automatically detect the level based on one or more items visible within the FOV of the user.

6. The augmented reality system of claim 1, wherein the processor is further programmed to:
    automatically detect a new level in the hierarchical set of informational items in response to the user moving through the augmented reality environment;
    update the contextual breadcrumb list, wherein the updated contextual breadcrumb list represents a path from at least one parent node in the hierarchical set of informational items to the new level; and
    display the updated contextual breadcrumb list and the transient user interface control within the FOV of the user.

7. The augmented reality system of claim 1, further comprising:
    a remote computing device and a wearable augmented reality device, wherein the remote computing device generates the contextual breadcrumb list based on the input received from the wearable augmented reality device, and wherein the remote computing device sends the contextual breadcrumb list to the wearable augmented reality device via a network for display to the user.

8. A method for generating an augmented reality environment comprising a partial real-world reality and a partial virtual reality, the method comprising:
    automatically identifying, by at least one processor, a first item among a current group of informational items within a current field of view (FOV) of a user and associated with the augmented reality environment, the augmented reality environment comprising a plurality of groups of informational items, wherein the identified first item is in the real-world reality that is currently within the FOV of the user;

based at least on the identified first item, automatically inferring a hierarchical set of informational items;

identifying a second item in the real-world reality that is currently within the FOV of the user:

generating a contextual breadcrumb list representing a path from at least one parent node in the hierarchical set of informational items to a level detected within the hierarchical set of informational items comprising the second item;

presenting the contextual breadcrumb list and a transient user interface control for display within the FOV of the user by the augmented reality device;

performing an action, by a task component, on the second item based on input received from the user via the transient user interface control; and presenting a result of the performed action to the user.

9. The method of claim 8, wherein the action is a transient sort and further comprising:

receiving the input indicating the user selection of a sort control associated with the transient user interface control; and sorting items within the detected current group of informational items based on at least one sort criteria, wherein items within the current group of informational items are sorted, and wherein items within the plurality of groups of informational items that are excluded from the current group of informational items remain unsorted.

10. The method of claim 9, wherein the action is a transient filter and further comprising:

receiving the input indicating the user selection of a filter control associated with the transient user interface control; and filtering the detected current group of informational items based on at least one criteria, wherein items within the plurality of groups of informational items that are excluded from the current group of informational items are excluded from the filtering.

11. The method of claim 8, wherein the action is a transient search and further comprising:

receiving the input indicating the user selection of a search control associated with the transient user interface control; and performing a search on the detected current group of informational items based on at least one search criteria, wherein items within the plurality of groups of informational items that are excluded from the current group of informational items are excluded from the search.

12. The method of claim 8, wherein the plurality of groups of informational items are items in the hierarchical set of informational items, and further comprising:

automatically detecting a change in a context of the plurality of groups of informational items, wherein the change in context comprises a user walking through the augmented reality environment.

13. The method of claim 8, further comprising:

retrieving a contextual map associated with at least a portion of the augmented reality environment associated with a current location of the user, wherein the contextual map comprises an indicator identifying the current location of the user relative to at least one feature of interest within the portion of the augmented reality environment.

14. The method of claim 8, further comprising:

automatically detect a new current level in the hierarchical set of informational items in response to a user movement changing the FOV of the user to include a different portion of the hierarchical set of informational items; and present an updated transient user interface control directed to the new current level within the FOV to the user.

15. One or more computer storage media embodying computer-executable components generating an augmented reality environment comprising a partial real-world reality and a partial virtual reality, said components comprising:

a navigation engine component that when executed, causes at least one processor to:

identify a first item in the real-world reality within the field of view (FOV) of a user;

based at least on the identified first item, automatically infer a hierarchical set of informational items:

identify a second item in the real-world reality that is currently within the FOV of the user:

based at least on the identified first item and the identified second item, automatically identify a level in a hierarchical set of informational items within the augmented reality environment in response to detecting a change in a context associated with at least one portion of the hierarchical set of informational items presented within the FOV of a user by an augmented reality device and a contextual breadcrumb list within the FOV, the contextual breadcrumb list representing a path from a root node in the hierarchical set of informational items to the level;

a transient user interface control component, that when executed, causes the at least one processor to display the contextual breadcrumb list and a set of controls within the FOV; and a transient task component, that when executed, causes the at least one processor to perform an action on at least one group of informational items within the level based on input received via the set of controls associated with the transient user interface control and present results of the performed action for display to the user.

16. The computer storage media of claim 15, wherein the hierarchical set of informational items includes transcribed text of at least a portion of a conversation associated with at least one topic of conversation.

17. The computer storage media of claim 15, wherein the change in the context comprises a user moving through at least a portion of the augmented reality environment to change at least one item displayed within the FOV.

18. The computer storage media of claim 15, wherein the action performed by the task component includes at least one of a transient sort, a transient search, or a transient filter performed within the current context based on at least one criteria.

19. The computer storage media of claim 15, wherein the one or more computer storage media embodying computer-executable components further comprise:

a navigation engine on a remote computing device, that when executed, causes the at least one processor to receive input from a transient user interface control associated with the augmented reality device via a network; perform the action based on the input; and send results of the performed action to the transient user interface control associated with the augmented reality device via the network.

20. The computer storage media of claim 15, wherein the transient user interface control component on the augmented reality device causes the at least one processor to receive navigation aids, including the contextual breadcrumb list, from a navigation engine associated a remote computing device via a network; and display the navigation aids to the user via the FOV generated by the augmented reality device, the navigation aids corresponding to the hierarchical set of informational items.

* * * * *